(12) United States Patent
Peterson et al.

(10) Patent No.: US 9,620,030 B2
(45) Date of Patent: Apr. 11, 2017

(54) METHOD AND SYSTEM FOR ENHANCING WORKING MEMORY

(71) Applicant: Mind Research Institute, Irvine, CA (US)

(72) Inventors: Matthew R. Peterson, Irvine, CA (US); Nigel Nisbet, Irvine, CA (US); Ki Karou, Irvine, CA (US); Nicholas Chen, Irvine, CA (US); Paul B. Blair, Irvine, CA (US); Delicia Woon, Irvine, CA (US); Marc Humpert, Irvine, CA (US)

(73) Assignee: MIND RESEARCH INSTITUTE, Irvine, CA (US)

( * ) Notice: Subject to any disclaimer, the term of this patent is extended or adjusted under 35 U.S.C. 154(b) by 293 days.

(21) Appl. No.: 13/831,147

(22) Filed: Mar. 14, 2013

(65) Prior Publication Data

US 2014/0272840 A1     Sep. 18, 2014

(51) Int. Cl.
*G09B 5/02* (2006.01)
*G09B 19/00* (2006.01)

(52) U.S. Cl.
CPC .................. *G09B 19/00* (2013.01)

(58) Field of Classification Search
CPC ........................................... G09B 5/02
USPC ........................................... 434/236
See application file for complete search history.

(56) References Cited

U.S. PATENT DOCUMENTS

| | | | |
|---|---|---|---|
| 6,402,520 B1* | 6/2002 | Freer | 434/236 |
| 7,887,329 B2 | 2/2011 | Greenshpan et al. | |
| 2004/0180317 A1* | 9/2004 | Bodner et al. | 434/353 |
| 2007/0166675 A1* | 7/2007 | Atkins et al. | 434/236 |
| 2009/0130640 A1 | 5/2009 | Hardy et al. | |
| 2010/0068686 A1 | 3/2010 | Ueshima | |
| 2010/0113152 A1* | 5/2010 | Shmuel | 463/36 |
| 2011/0256514 A1 | 10/2011 | Halberda | |
| 2012/0077160 A1 | 3/2012 | DeGutis et al. | |
| 2012/0189990 A1 | 7/2012 | Bavelier et al. | |
| 2012/0208169 A1 | 8/2012 | Nutley et al. | |
| 2012/0214143 A1 | 8/2012 | Severson et al. | |
| 2012/0251989 A1* | 10/2012 | Wetmore et al. | 434/236 |

OTHER PUBLICATIONS

Jaeggi, et al., "Does Excessive Memory Load Attenuate Activation in the Prefrontal Cortex? Load-Dependent Processing in Single and Dual Tasks: Functional Magnetic Resonance Imaging Study", Neuroimage 19(2), p. 210-225, (2003).

Jaeggi, et al., "Improving Fluid Intelligence with Training on Working Memory", Proceedings of the National Academy of Science, vol. 105 No. 19, (Mar. 18, 2008).

(Continued)

*Primary Examiner* — Xuan Thai
*Assistant Examiner* — Robert P Bullington
(74) *Attorney, Agent, or Firm* — Klein, O'Neill & Singh, LLP

(57) ABSTRACT

Apparatus and methods for enhancing a working memory of a human is provided. A computing system having a processor executing instructions out of a memory device presents a plurality of selectable working memory domains corresponding to cognitive functions of a human brain, where each working memory domain is associated with a corresponding training game that is configured to enhance a selected working memory domain.

19 Claims, 21 Drawing Sheets

(56) References Cited

OTHER PUBLICATIONS

Jaeggi, et al., "The Relationship Between N-Back Performance and Matrix Reasoning—Implications for Training and Transfer", Intelligence (2010), doi:10.1016/j.intell.2010.09.001.
Posit Science, http://www.positscience.com/.
MindSparke, http://www.mindsparke.com/about.php?id=whoweare.
Cogmed, http://www.cogmed.com/training-working-memory.
Lumosity, http://www.lumosity.com/.
Jungle Memory, http://junglememory.com/.

* cited by examiner

METHOD AND SYSTEM FOR ENHANCING WORKING MEMORY

TECHNICAL FIELD

The present disclosure relates to machine implemented methods and apparatus for improving working memory of humans.

RELATED ART

Cognitive scientists acknowledge that computational fluency for performing mathematical operations is a function of a brain's working memory, its size and strength to handle multi-step exercises and spatial manipulation. The scientific knowledge for explaining the functionality of working memory at a cellular and electrochemical level has been underdeveloped, until recently. It had been previously theorized that there was an executive function of the brain that was responsible for solving problems and that it generally performed tasks by selectively retrieving knowledge from long-term and short-term memory. With this limited knowledge, the primary way to improve cognitive function and concentration was assumed to occur using memorization exercises.

Based on this faulty premise, most of the virtual exercises currently available in the marketplace to develop working memory use incomplete or inaccurate neural models of cognition. These exercises typically assume that working memory is a storage area only, which accepts input and allows retrieval. Distracting information is typically introduced in these types of virtual exercises to increase a recall challenge and users may learn to use higher-order associative tasks to increase their recall abilities. However, these exercises do not sharpen or expand the capacity of one's working memory.

Furthermore, conventional virtual games do not accommodate the brain's need to perform complex mathematical operations in working memory and do not lead to greater computational proficiency. Conventional virtual games simply attempt to improve short-term memory skills.

One type of conventional games or training exercises are referred to as "n-back games" and similar "dual n-back games". In an n-back and/or dual n-back game, a subject is asked to monitor the identity or location of a series of verbal or nonverbal stimuli. The subject then indicates when a currently presented stimulus is the same as the one presented in the "n" trials before. Unfortunately, these n-back exercises have several deficiencies. They only address one aspect of a working memory and have not been designed to isolate gains in computational fluency. These games escalate in difficulty too rapidly from a first to a second challenge level. The games discourage users who may adequately perform tasks at a first level, but then are overwhelmed by the difficulty in the next level. Therefore, these games are ineffective in training working memory and do not promote computational fluency in students.

Research in cognitive neuroscience has demonstrated that working memory uses different areas of the brain and that working memory employs varied and complex mechanisms for coordinating active neuro-circuits. Conventional techniques that are designed to improve attention span or rote memorization skills fail to adequately improve working memory. Continuous efforts are being made for developing techniques and apparatus that can improve the use of one's working memory and computational fluency skills.

SUMMARY

In one embodiment, an apparatus for enhancing a working memory of a human is provided. A computing system having a processor executing instructions out of a memory device presents a plurality of selectable working memory domains corresponding to cognitive functions of a human brain, where each working memory domain is associated with a corresponding training game that is configured to enhance a selected working memory domain.

In another embodiment, a machine implemented method for enhancing a working memory of a human is provided. The method includes presenting a plurality of selectable working memory domains corresponding to cognitive functions of a human brain, where each working memory domain is associated with a corresponding training game that configured to enhance a selected working memory domain. Based on the selected memory domain, a processor executes a training game corresponding to the selected working memory domain.

In yet another embodiment, a machine implemented method for enhancing a working memory of a human is provided. The method includes presenting a plurality of selectable working memory domains corresponding to cognitive functions of a human brain, where each working memory domain is associated with a corresponding training game that is configured to enhance a selected working memory domain; and based on the selected memory domain, a processor executing a training game corresponding to the selected working memory domain. A user selects a challenge level for the training game and if a user has played the training game before, then user data is used to set a challenge level for the game.

A first memory domain from among the plurality of working memory domains is to slow a frequency of theta wave forms to increase a number of cognits that may be manipulated within one cycle. A second memory domain from among the plurality of memory domains is for decreasing a memory slot width assigned to a cognit and for increasing a number of slots and cognits. A third memory domain from among the plurality of memory domains is intended to prolong retention and activity of the working memory cognits along a continuous sequences of theta waveforms. A fourth memory domain from among the plurality of memory domains is intended to increase a working function and computational capacity for working memory slots. A fifth memory domain from among the plurality of memory domains is intended to shield a working memory from external distracters.

This brief summary has been provided so that the nature of this disclosure may be understood quickly. A more complete understanding of the disclosure can be obtained by reference to the following detailed description of the various embodiments thereof in connection with the attached drawings.

BRIEF DESCRIPTION OF THE DRAWINGS

The foregoing features and other features will now be described with reference to the drawings of the various embodiments. In the drawings, the same components have the same reference numerals. The illustrated embodiments are intended to illustrate, but not to limit the present disclosure. The drawings include the following Figures.

DETAILED DESCRIPTION

Figure 1:
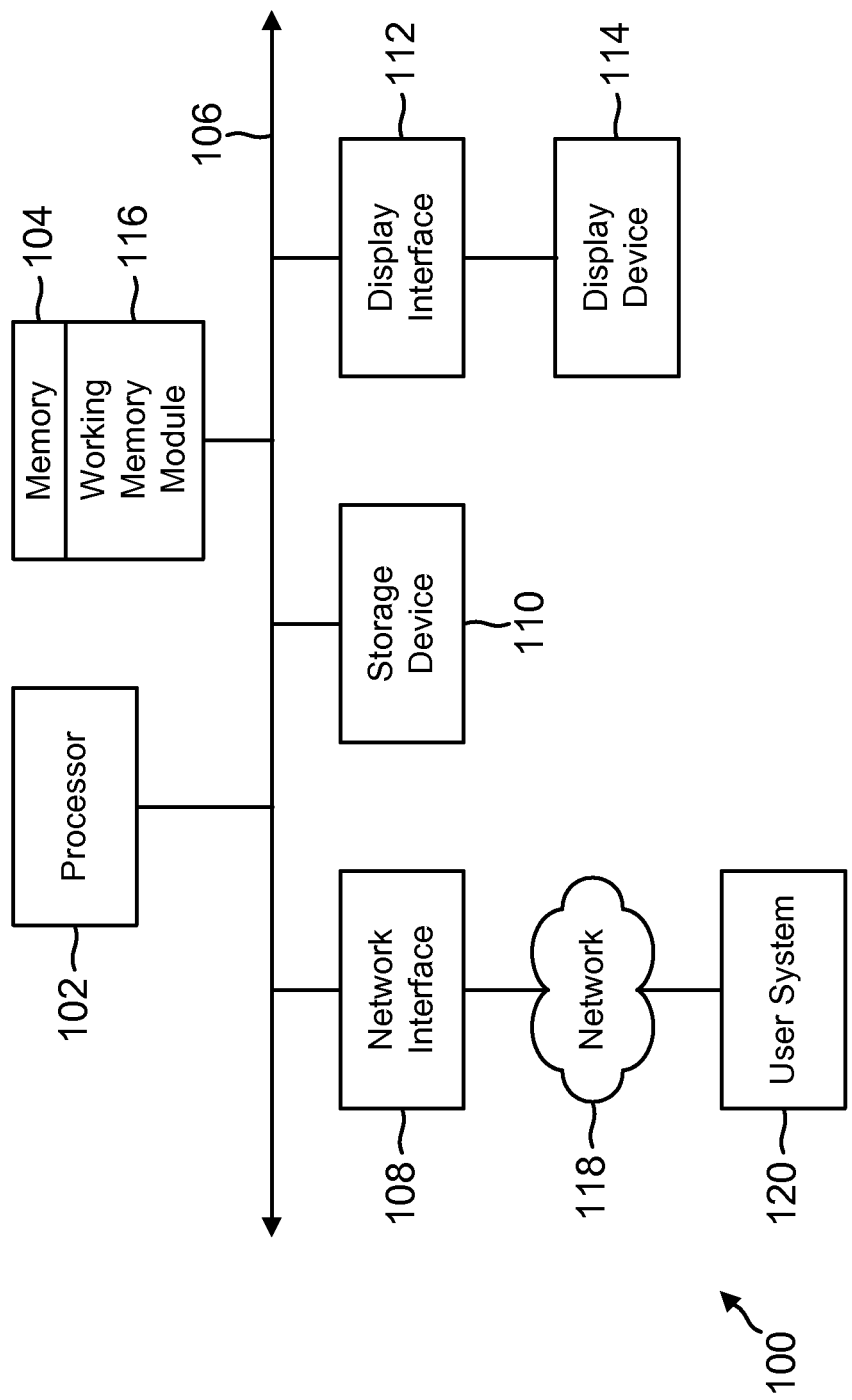
FIG. 1 illustrates a system for implementing the various embodiments of the present disclosure.

In the following detailed description of the embodiments, reference is made to the accompanying drawings in which like references indicate similar elements, and in which is shown by way of illustration specific embodiments in which the invention may be practiced. These embodiments are described in sufficient detail to enable those skilled in the art to practice the embodiments, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

As preliminary note, the terms "component", "module", "system," and the like as used herein are intended to refer to a computer-related entity, either software-executing general purpose processor, hardware, firmware, and/or a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various non-transitory, computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

Based on current research in neuroscience, there are five characteristics of working memory that may be trained to improve cognitive function. These five characteristics are correlated with a theory of working memory that presumes that theta rhythms in the human brain regulate how neural networks are triggered. According to this theory, once a neural circuit (cognit) fires, it has a period of inhibition. The term cognit as used herein means an overlapping, distributed and interactive network of neurons that represent memory and knowledge.

As the neural circuit is inhibited, another cognit fires, and then it too is inhibited. For each theta cycle, this process repeats for the series of related cognits that are being maintained in the working memory at any given time. The resulting sequence of cognit activity may be visualized graphically as a series of adjacent slots; each slot represents the initial activation and sustained activity of a neural network or cognit over a period of time. A slot is a discrete working memory unit for which a single cognit may be active for a discrete duration. Approximately, 5-9 slots are available at any given time and the number of active slots is governed by the theta frequency produced in the brain.

The slots fire in a sequence and as the sequence is repeated, the information stays in the working memory. Approximately 5-9 slots fire in a repeated sequence along each cycle of the theta wave. The characteristics of the slots and the theta wave may be altered to improve working memory.

In one embodiment, an apparatus and machine implemented methods/virtual games for exercising working memory and improving computational fluency are provided. The virtual games provided herein are intuitive, do not demand language mastery from the user, and build working memory through spatial-temporal (ST) exercises. The various games described below in detail are constructed to create efficiencies in the frequency, firing, retention, and conditioning of the brain neuro-circuits that are responsible for manipulating cognits.

In one embodiment, the techniques and virtual games described below in detail, offer targeted assistance to students faced with learning disabilities or low socio-economic status. The limited attention span, high distractibility, poor impulse control and language barriers experienced by these students are all recognized as interfering with their ability to maximize cognitive function. For these and all other students, improvements in working memory will result in improved cognitive function for mathematic operations.

To facilitate an understanding of the various embodiments of the present disclosure, the general architecture and operation of a computing system is described first.

System 100:

FIG. 1 is a high-level block diagram showing an example of the architecture of a processing system, in which executable instructions as described below can be implemented. Note that certain standard and well-known components which are not germane to the present disclosure are not shown in FIG. 1.

The processing system 100 includes one or more processors 102 and memory 104, coupled to a bus system 106. The bus system 106 shown in FIG. 1 is an abstraction that represents any one or more separate physical buses and/or point-to-point connections, connected by appropriate bridges, adapters and/or controllers. The bus system 106, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 102 are the central processing units (CPUs) of the processing system 100 and, thus, control its overall operation. In certain embodiments, the processors 102 accomplish this by executing programmable instructions stored in memory 104. A processor 102 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware based devices.

Memory 104 represents any form of random access memory (RAM), read-only memory (ROM), flash memory, or the like, or a combination of such devices. Memory 104 includes the main memory of the processing system 100. Instructions, for example, a working memory module 116 which implements techniques introduced herein may reside in and may be executed (by processors 102 from memory 104.

Also connected to the processors 102 through the bus system 106 are one or more internal mass storage devices 110, and a network interface 108. Internal mass storage devices 110 may be or may include any conventional medium for storing large volumes of data in a non-volatile manner, such as one or more magnetic or optical based disks.

The network interface 108 provides the processing system 100 with the ability to communicate with remote devices and systems via a network 118. For example, a user system 120 may access the working memory module 116 via network 118. Network 118 may be a local area network (LAN), wide area network (WAN), wireless network or any other network type. The user system 120 may be desktop computers, laptop computers, notebook computers, tablet computers, smart phones, personal digital assistants or any other computing device type. The embodiments disclosed herein are not limited to any computing device type or network type.

Processing system 100 also includes a display device 114 that interfaces with processor 102 via a display device interface 112. The display device 114 may be used to display training games, as described below in more detail.

The processing system 100 may also include one or more input/output (I/O) devices (not shown) that may include, for example, a keyboard, a mouse and others. Details of these devices are not germane to the embodiments disclosed herein.

Figure 2A:
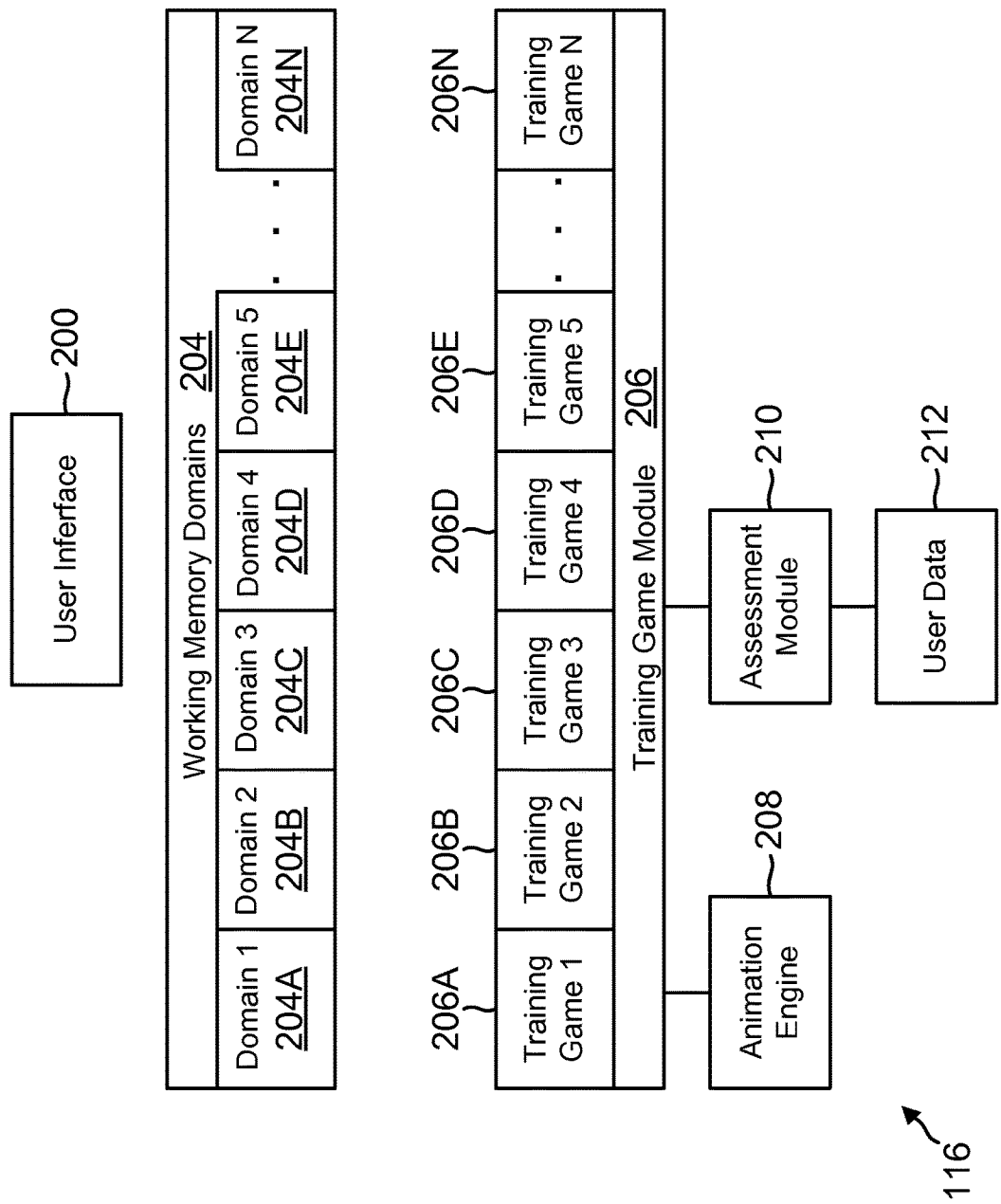
FIG. 2A shows a block diagram of an architecture of a working memory module, according to one embodiment.

Working Memory Module 116:

FIG. 2A shows a block diagram of the working memory module 116 that is used to present training games for specific memory domains for improving computational fluency. Working memory module 116 may be executed at a stand-alone computing device or accessible via a network (for example, 118). It is noteworthy that working memory module 116 may be implemented as software, hardware or a combination thereof.

Working memory module 116 provides a plurality of training games that are designed to engage neuro-circuits in the dorsolateral prefrontal cortex of the brain and optimize the way the brain manages and manipulates numeric and geometric data. Each game engages a user in mental training exercises that specifically target and expand working memory capacity within a specific memory domain. Though each game may be independently designed to uniquely train one or more aspects of the brain's neural structure and functioning, unlike conventional systems, the games directly affect brain wavelengths and neuro-circuit timing, and the cumulative improvement in the user's math fluency as the entire suite of games is successively practiced over time.

Working memory module 116 scaffolds a game's difficulty level gradually so that users may improve performance without losing motivation. User game play and outcomes are measured and reported to the user, for example, at a display device or otherwise.

In one embodiment, the games provided by the working memory module 116 are not based on the user having to learn rules, but are intuitive and easily accessible. This is achieved by presenting new users with game demonstrations that the user watches without inputting answers, and then offering an entry level version of the game that is not taxing to the user mentally or physically. Unlike many video games, user success does not need high levels of hand-eye coordination or sophisticated gaming consoles. With repeated use of the games, the user gradually improves performance.

Referring now to FIG. 2A, the working memory module 116 includes or interfaces with a user interface 200 that is provided at a display device. The working memory module 116 provides a suite of training games 206A-206N (may be referred to as training game module 206 or as training game 206), where the games are associated with a working memory domain 204 having a plurality of domains, shown as domain 204A-domain 204N. Although the description below is based on five working memory domains, the methodology described herein is applicable to more than five memory domains, if and when more memory domains are developed. Furthermore, even though only a single game for each domain has been described, the embodiments herein are applicable to having a series of games for each domain.

The training game module 206 is associated with an animation engine 208 that provides animation for each game. It is noteworthy that although a separate animation engine 208 has been shown, each game may have its own animation engine. The embodiments disclosed herein are not limited to who and where the animation is performed. Examples of using the animation engine are described below.

Working memory module 116 includes an assessment module 210 that is used to track a user's performance and profile when a training game is executed. The assessment module 210 matches a user's performance with a playing level, as described below in detail. User data 212 may be stored at a storage device and used by assessment module 210 to increase or decrease the challenge level for a game, as described below in detail. As an example, user data 212 may include, user login credentials, user's preferences, user's performance data for different games, user's progress over different games and other user related data.

Training games 206A-206E have been developed with at least the following goals: (a) Training exercises that slow the frequency of theta waveforms in the brain and make it possible to increase the number of cognits that may be manipulated during one cycle. (b) Reduce the duration of neural activity required by a given cognit, and do so within the specific domains that contribute to mathematical reasoning. This is equivalent to increasing the gamma frequency, which allows more slots to be active during each theta cycle. (c) Prolong the retention and activity of the working memory cognits along continuous sequences of theta waveforms. (d) Practice modifying content in working memory slots and/or manipulating the slots to maximize the working function and computational fluency. (e) Practice shielding the working function of modifying and manipulating from external distracters.

In one embodiment, working memory module 116 presents a selectable menu to a user on display device 114. The user selects a memory domain from among 204A-204N and a game associated with the selected memory domain. It is noteworthy that each memory domain may have a plurality of training games. The user has the option of running a tutorial with neuro feedback illustrations on the five working memory training goals. This non-game feature is designed to raise the meta-cognition of the user and help the user to facilitate progress in the games.

The games that are presented to the user offer visual data that is retained by the user to solve mathematical problems during the game. With practice, the games prime the brain to perform routine and complex computations.

Working memory module 116 includes an automatic play mode that selects a game for the user based on prior performance and user data 212. Once a game is selected, if it is the first time the user plays that game, the working memory module 116 presents an animated tutorial to the user to demonstrate the game's objectives. The tutorial demonstrates a staged version of the game to allow the user to learn the game's controls and option.

Assessment module 210 provides feedback to the user with respect to the five strategic goals described above. The assessment may be provided as a visual display for each working memory domain. The assessment is saved as user data 212 and used when the user returns.

Figure 2B:
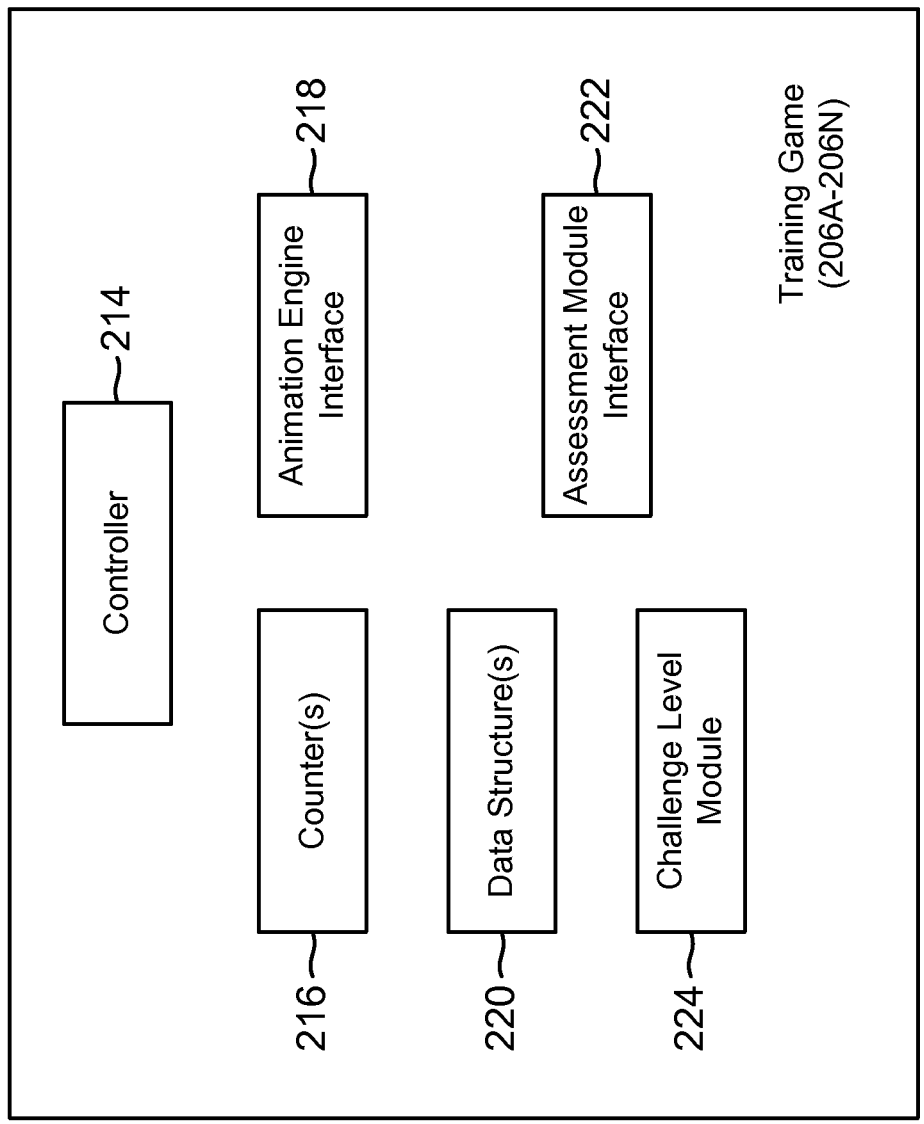
FIG. 2B shows an architectural block diagram of a training game, according to one embodiment.

Training Game 206:

FIG. 2B shows an architectural block diagram for a training game 206 having a plurality of training games. The architecture may be customized for individual game types for each working memory domain. Training game 206 includes a controller 214 that controls the various aspects of a training game. In one embodiment, each game 206A-206N includes controller 214 that may be customized for the game.

Animation interface 218 is configured to interface with animation engine 208, while the assessment module interface 222 interfaces with the assessment module 210. A challenge level module 224 is used to adjust the challenge level for a user.

Training game 206 may also include a plurality of counters 216. The counters 216 are maintained to track false negatives, false positives, response time, or all, as described below with respect to some sample games. Counters 216 may be customized based on the game type.

Training game 206 also maintains a data structure 220 for storing game related information, including threshold values and other information. Data structure 220 is used to produce or display objects to the user. The use of data structure 220 with respect to the various games is also described below in detail.

Figure 3:
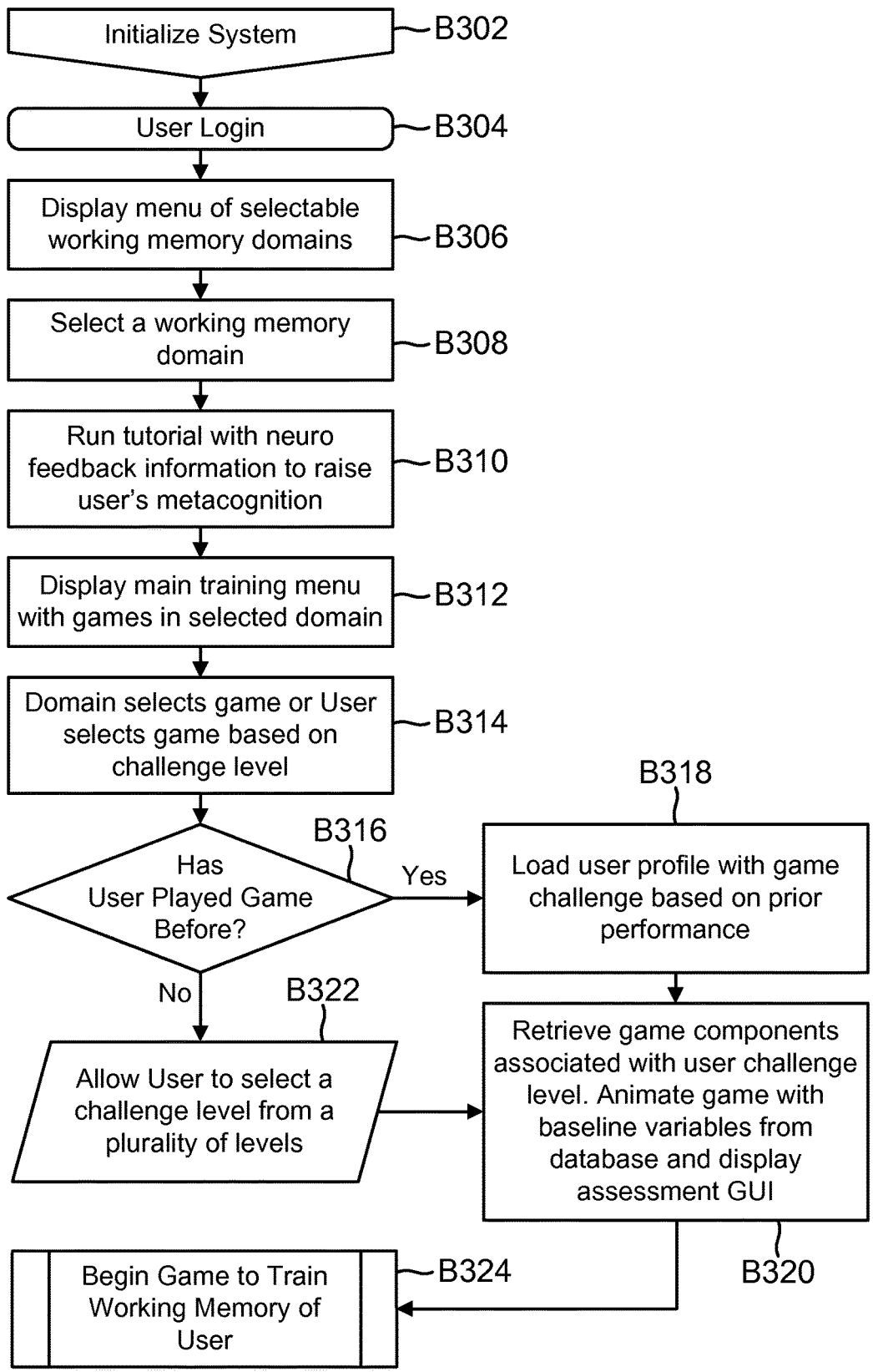
FIG. 3 shows a process flow for using the working memory module, according to one embodiment.

Overall Process:

FIG. 3 shows a process 300 for working memory enhancement by using the working memory module 116, according to one embodiment. The process begins in block B302, when a system executing working memory module 116 is operational. The working memory module 116 may be executed by processor 102 at a computing system that is accessible to user system 120 or at the user system 120. When the working memory module 116 is executed by user system 120, then display device 114 is a part of user system 120 or interfaces with user system 120. The embodiments disclosed herein are not limited to where the working memory module 116 or any of its components are executed.

In block B304, a user using system 120 logs into the system executing working memory module 116. User data 212 is used to validate user credentials.

In block B306, the user is displayed a menu of working memory domains 204A-204N. As an example, the user is displayed five different memory domains that are described in detail below. The user selects a working memory domain in block B308. In block B310, a tutorial may be run with a physiologically meaningful and accurate feedback mechanism to raise a user's meta-cognition.

In block B312, a menu of games for the selected memory domain is displayed. Depending upon the user's challenge level in the domain, either the domain assigns a game or the user selects a game in block B314.

Each working memory domain uses a particular construct or series of processes to manage and assess game play according to a specific training goal. The variables that are associated with the games in each domain are similar, so user performance with a variable in one game can be correlated with the same variable in another game within the same domain. Therefore assessments within a single domain are achieved by combining performance values for the same variable across several games. According to game objectives, some game variables are fundamental for achieving the training goal(s) and some variables are more suited for increasing the challenge level.

The Assessment Module Interface 222 for each game identifies the game variables that will be compiled and computed by the Assessment Module 210. The assessment outcome is then provided to the Challenge Level Module 224 so that user challenge levels for each game and domain may be correlated and possibly adjusted with the new assessment data.

Each user is assigned a plurality of challenge levels, for example, five different challenge levels, one for each memory domain. A single user may be at different levels of challenge within each domain. Some of the games include objectives that span two or more domains. For those games, the variable(s) that are associated with one domain are managed, and the outcomes monitored, by that domain. The other game variable(s) are managed and monitored by the corresponding domains.

In block B316, the process determines if the user has played the game before. If yes, then the user profile is loaded from user data 212 stored at a storage device. In block B320, the game components associated with the user level are obtained from memory and executed. Thereafter, in block B324, the user plays the game for training and improving working memory.

If the user had not previously played the game, as determined in block B316, the user is provided with an option to select a playing level in block B322. Thereafter, the process moves to block B320 that has been described above. The following describes the various training game objectives as they are associated with various memory domains that are presented to a user in block B306:

In the first memory domain 204A, the game objectives for game 206A and other similar games for memory domain 204A are to minimize the number of wrong guesses to puzzles displayed to a user per unit of time (i.e. a false positive rate), to minimize the number of missed guesses for correct answers per unit of time (i.e. a false negative rate), to maximize correct matches, to evaluate and blend geometric forms into composite geometries and to perform at increasingly difficult skill levels. An increased challenge level in this domain is associated with displaying an increasing number of puzzle solutions that are likely to produce false positives and reducing the frequency of correct matches that appear in the puzzle.

In the second memory domain 204B, the game objectives include differentiating digits, mathematic operators, and geometries in an accelerated spatial-temporal manner with short exposure times and developing a strong number or symbol sense. An increasing challenge level associated with these game objectives involves reducing the timing interval between identifiable complete characters and partial characters in the rapid-paced animation.

In the third memory domain 204C, the game objectives are for the user to understand and remember a series of mathematical operations executed upon a geometric form, number, equation, or array; and the user can apply that same series to another geometric form, number, equation or array, without skipping or eliminating any steps. With increasing challenge levels, the number of steps and the complexity of the mathematic operations increases. In this domain, the assessment routines identify which step in the sequence, or what type of step is most likely to be dropped by the user during game play and challenge levels and game play is adjusted to reinforce or strengthen that weakness. Other game variables that are related to the challenge level are the observed duration of the transformation step, the use of single-step transformations vs. compound (multi-step) transformations and the presentation of potential solutions in a visual multiple choice, or freehand format.

In the fourth memory domain 204D, the game objective is to perform mathematical operations with multiple, discrete quantities or geometries that are maintained in working memory and achieve a numerically correct result. The lower challenge levels achieve this objective with spatial-temporal addition and subtraction of ten frame boxes that permit subitizing. The term subitizing as used herein means "suddenly" i.e. seeing how many objects are present from a perceptual appreciation rather than from counting. Subitizing is considered a more basic skill than counting and may be considered as a pre-cursor to counting.

As the challenge levels increase, the number and type of operands and the operations increase in complexity and length. The fourth memory domain may not offer multiple choice format solutions, but expects that users provide the solution in the workspace. The assessment of user performance is based on the number of correct replies in a given unit of time at each challenge level. The game variables in this domain include the total number of operands, the type of operation(s) between operands, the place value of the operands, the type of operand, the order of the operations, the number of operands obscured, the span width for selecting operands, the scrolling and pause rates for moving operands and the time allowed to develop a solution.

In the fifth memory domain 204E, the user participates in unique games designed to build resistance to distracters, which affect computational fluency, or in already-played games that operate under one of the other working memory domains, but also have distracting animation added to the game play. The game objectives for either type of game are the same and computational proficiency can be maintained despite the intermittent appearance and/or persistence of distracting elements in the virtual game environment.

If the games are of the latter type, they may not be played until the user has already trained in one or more of those domains and has test scores that may be compared to game play with the added distracters. The comparison between games with and without distracters will factor into the scoring and assessment of user performance in this domain. Though the games in this domain are varied from one another, the distracter characteristics are similar.

The distracter variables consist of distracter size, color, and visual similarity to the main game operands, the total number of distracters, the amount of time displayed, the visual tempo for the appearance and disappearance of distracters and operands in the animation, the distracters' proximity to, or overlap of the main game objects, the error tolerance allowed for the solution, the characteristics and number or operands, and whether the operands and operations for the puzzle are fully in view of the user, or are partially or fully obscured.

Figure 4A:
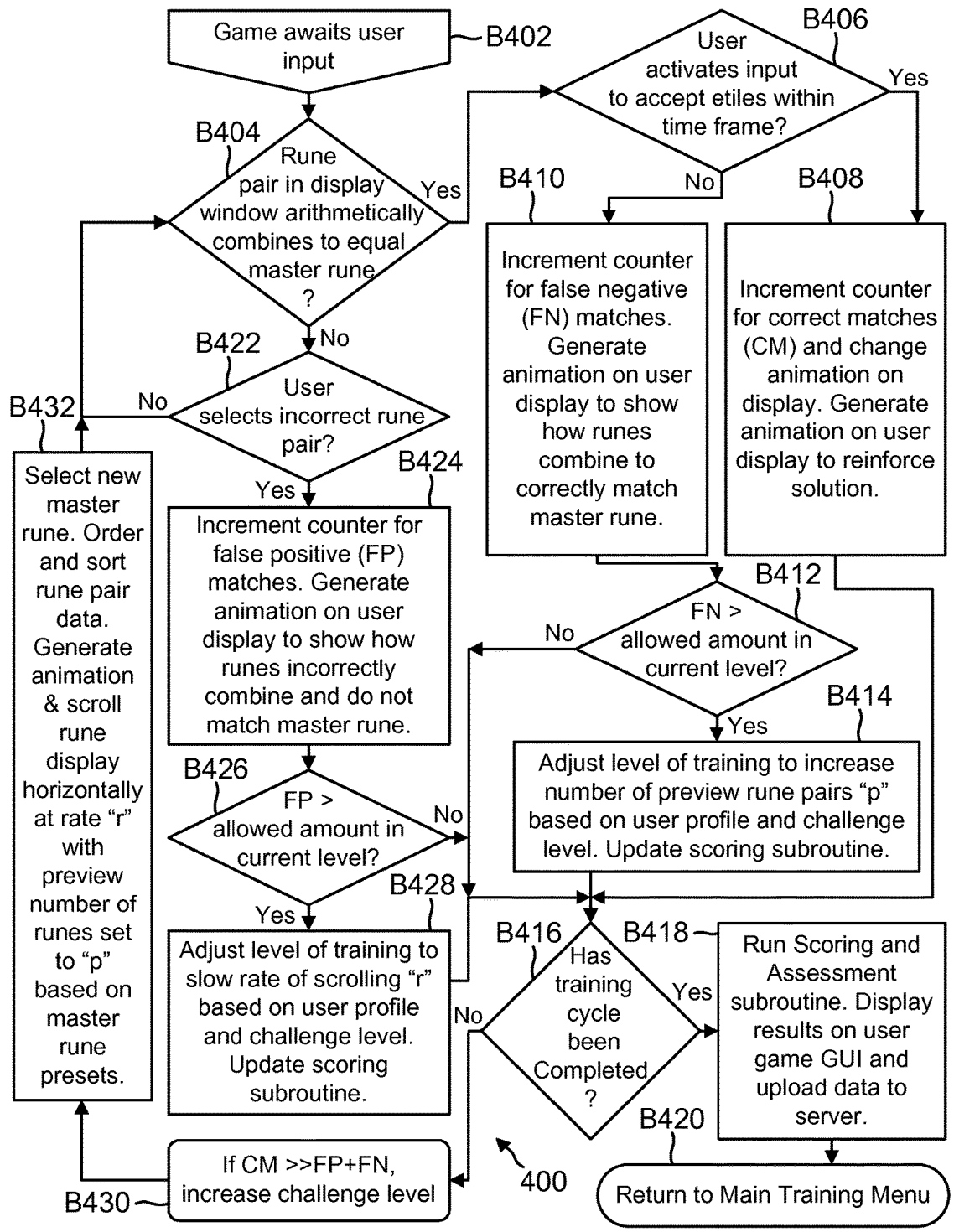
FIG. 4A shows a process flow of a training game for a first working memory domain, according to one embodiment.

Training Game 206A:

FIG. 4A shows a process 400 for executing game 206A for the first working memory domain 204A, according to one embodiment. To slow theta brainwaves via a virtual system, a user's impulse control is self-regulated such that the user enters a state of relaxed concentration. An example of one such game is called "Smash Runes" that is described below with respect to FIG. 4A and the screen shots of FIGS. 4B-4C.

Smash Runes combine user skills of visual-spatial manipulation and arithmetic operations. The object of the game is to select a pair of rune tiles, which when mathematically combined, create the same geometric form as a master rune tile.

The game's objective is met through the user's non-hurried study of potential solutions as rune tiles move across a display screen using animation. Smash Runes is more complex and mathematically relevant than a Go/No-go shape type recognition game that has been used by conventional training games to increase attention span. In a Go/No-go exercise, the user is expected to provide a response in one situation and hold back the response in another set of conditions.

In one embodiment, controller 214 for game 206A selects a master rune from a database (data structure 220, FIG. 2B) that is appropriate for a playing level. Animation engine 208 animates the master rune as a tile that is embossed with an image composed of symbols and/or composite geometric designs. From another database (may also be a part of data structure 220), controller 214 selects pairs of rune tiles that have been flagged as associated with the master rune tile and correlate with the challenge level of the game. Each pair of rune tiles represents a solution that may or may not be equivalent to the master rune tile.

Animation engine 208 displays the rune pairs in a sequence of horizontally scrolling 'wood' tiles that move from left to right (or right to left). The scrolling rate and the number of rune pairs that are simultaneously displayed on the computer screen are variables that change with the challenge level in the game. A faster scrolling rate and/or a higher number of displayed rune tile pairs represent greater challenge levels. Many of the rune tile pairs, when combined, will appear to have geometric and symbolic equivalence to the master rune. A greater similarity of those paired rune tiles to the master rune is a variable that is associated with a higher challenge level in the game.

Another game variable includes the frequency with which a matched rune pair is placed in the scrolled series. If a matched rune pair is infrequently placed in the series, this raises the challenge level as the user evaluates more solutions. At most challenge levels, the majority of rune pairs may not combine to match the master rune.

The difficulty of a geometric operation needed to combine any rune pairs is based on various factors. The process for ranking the combinatorial difficulty of the paired rune tiles is based on a predefined scale that factors the similarity of each rune in the pair to the master rune, the placement of each of the two runes (i.e. top or bottom), the type of mathematic operation used to combine the runes in the pair and the time that it takes to evaluate the match. Once difficulty rankings are assigned to the rune pair, those rankings are ordered in the scrolling series to present various challenge levels. This variable for a rune pair is separate from the similarity variable described above.

Training game 206A creates an animation of the master rune on a display screen. A decision window is animated adjacent to the master rune to momentarily display and hold the active rune pair in place as the user evaluates it. The amount of time that the rune pair pauses in the decision window before it is removed from the display area is a variable associated with the challenge level. A longer period of evaluation is associated with lower challenge levels. The rune pairs are visible for several positions to the left of the decision window and this may also be a variable that changes with the challenge level.

To play the game, the user presses a virtual control if the active rune pair in the decision window may be manipulated to match the master rune. If the user activates the virtual control and incorrectly identifies a match, then the training game adjusts the user score to reflect the error as a false positive. If the user fails to activate the virtual control when there is a match between the active rune pair and the master rune, then the game adjusts the user score to reflect the error as a false negative. If the user activates the virtual control at the time that the active rune pair and master rune are geometrically equivalent, then the game adjusts the user score to reflect the correct answer.

Additionally, there is a game objective to obtain as many correct answers as possible in a particular time period. Although there is no added penalty for working the game slowly, scoring is improved by achieving more correct solutions in a fixed period of game play. Depending upon the number of false positives, false negatives, correct answers, and other parameters of the challenge level, game variables may change for a next round of matching with a new master rune.

Referring now to FIG. 4A, process 400 for executing game 206A from a memory device by a hardware based processor begins in block B402, when game 206A waits for a user input. The game is initiated on a display device. The controller 214 selects a master rune tile (438 in screen shot 434, FIG. 4B) based on user level and ability. A series of rune pairs (for example, 436, FIG. 4B) are then displayed to the user. In one embodiment, the rune pairs scroll left to right. The objective of game 206A is for the user to select a pair, when combined geometrically matches the master rune 438.

Figure 4B:
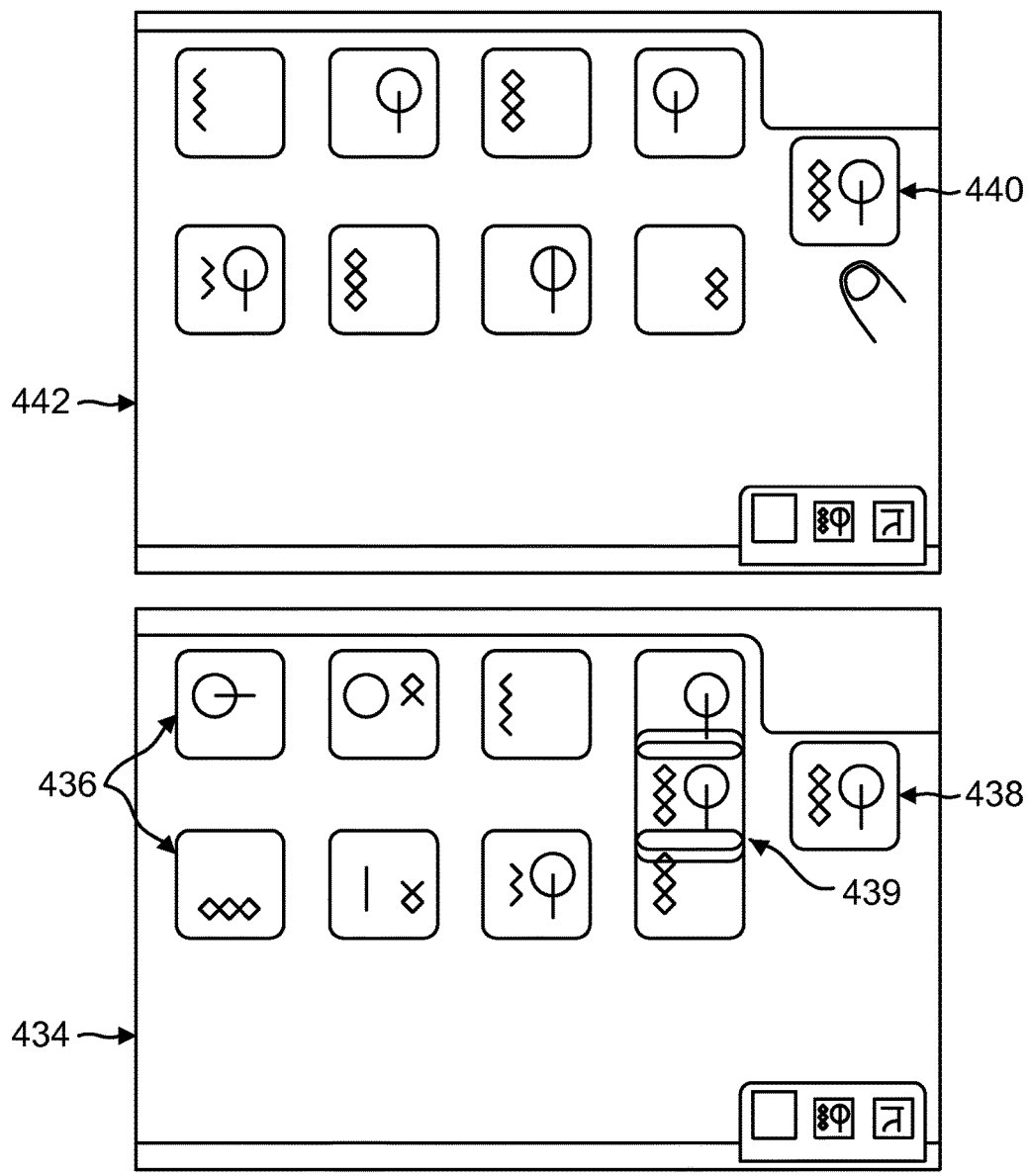
FIGS. 4B-4C show screen shots of a training game for a first working memory domain, according to one embodiment.
Figure 4C:
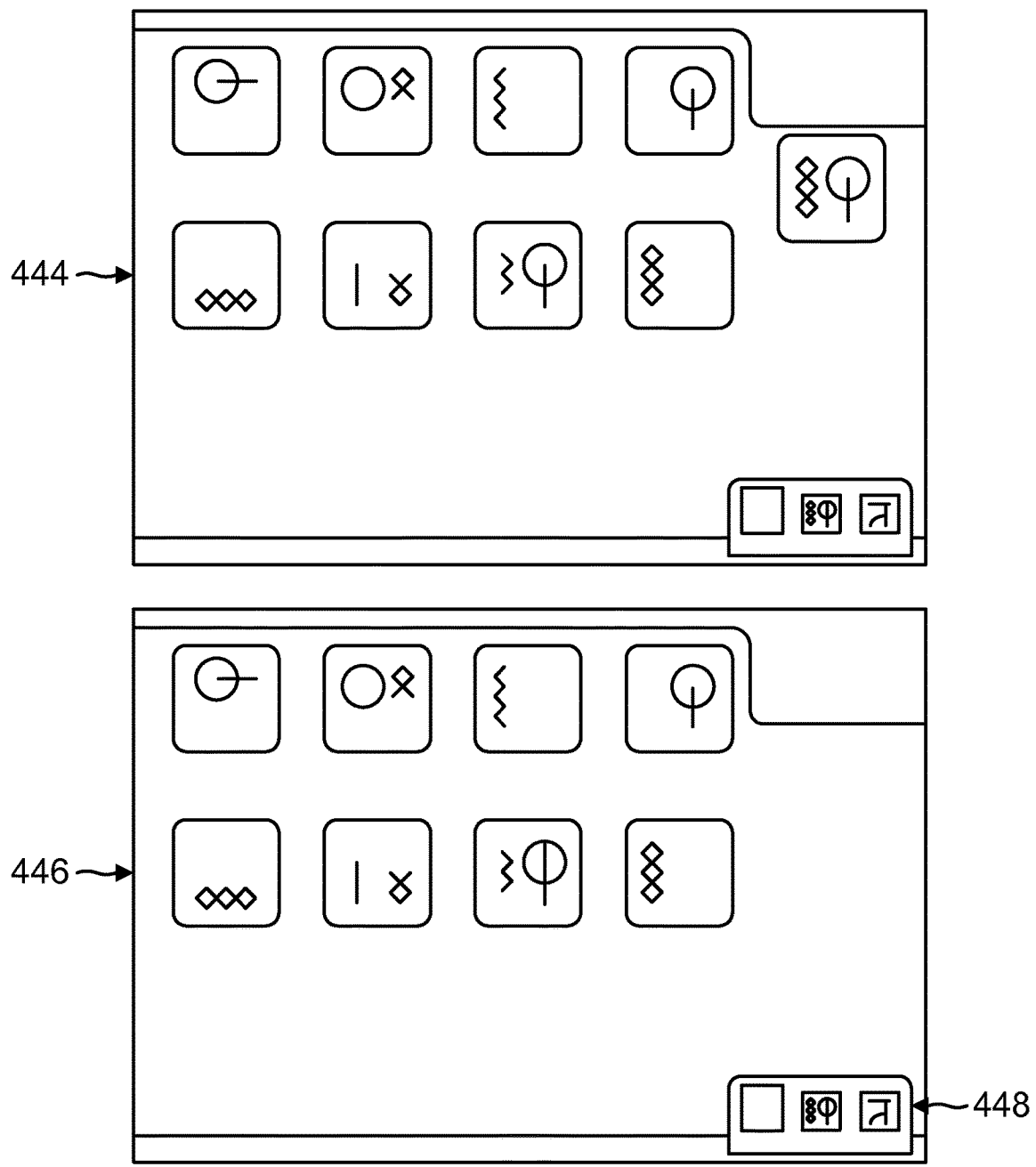

In block B404, controller 214 of game 206A determines if a displayed rune pair of tiles is equivalent to the master rune (for example, 439, FIG. 4B). If yes, then in block B406, the controller 214 determines if the user has activated the virtual control to accept the displayed rune pair tiles (or "etiles") within an acceptable time frame. This is shown as 440 in the screenshot 442 of FIG. 4B.

If the user accepted the rune pair tiles within the time frame, then in block B408, a counter (for example, 216, FIG. 2B) for correct matches (CM) is incremented. Animation engine 208 may display the correct result again to reinforce the correct solution. This is shown in the screen shot 444 of FIG. 4C. The process then moves to block B416 that is described below.

If the user did not accept within the time frame, then in block B410, a false negative (FN) counter is incremented. In one embodiment, the FN counter is also maintained by game 206A and may be a part of counters 216. Thereafter, animation engine 208 generates animation to show how runes combine to match the master rune 434.

The process then moves to block B412, when controller 214 for game 206A determines if the number of false negatives have reached a threshold value for the user level. The threshold value may be stored in data structure 220. If yes, then in block B414, the game level is adjusted to increase the number of rune pairs for the user profile and level of play using challenge level module 224. The information is used by assessment module 210 to update user profile/data 212.

If the number of false negatives has not reached the threshold value, then the process moves to block B416, when controller 214 determines if the current training cycle has been completed. If yes, then the process moves to block B418, when a scoring and assessment routine is run by assessment module 210. User data 212 is also updated. The results are displayed to the user and the process returns to the main training menu in block B420.

If the training cycle is not complete, then the process moves to block B430 when the challenge level is increased, if the number of correct matches is greater than the sum of the number of false positives and the number of false negatives. The process then moves to block B432, when a new master rune is selected. This is shown as item 448 of screen shot 446 in FIG. 4C. The rune pair data is sorted and animation is generated to scroll the rune pairs across the display device. The rate and the number of rune pairs ("p") may be preset based on the master rune.

Referring back to block B404, if the displayed rune pair tiles do not match the master rune, the process moves to block B422, when controller 214 determines if the user has selected an incorrect pair. If not, the process moves to block B432, described above.

If the user selects an incorrect rune pair tile, then in block B424, a counter for tracking false positives is incremented. Animation is then generated to show the incorrect match.

In block B426, controller 214 determines if the number of false positives for the user level have been exceeded. If not, then process moves to block B416.

If the number of false positives has been exceeded, then in block B428, the training level for the user is adjusted to slow the rate at which rune pair tiles are scrolled across the display. The scoring routine is then updated and the process moves to block B416 described above.

Figure 5A:
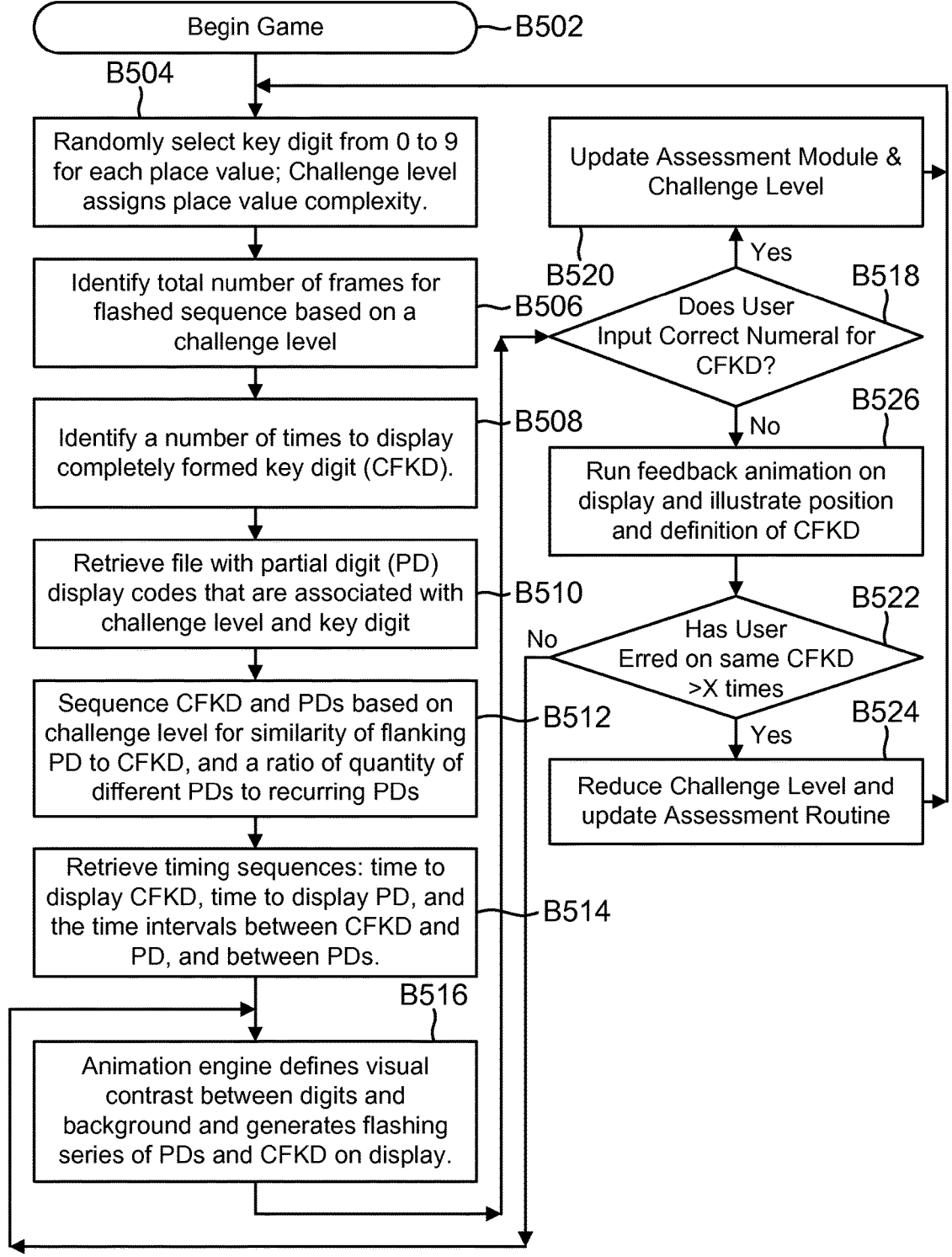
FIG. 5A shows a process flow of a training game for a second working memory domain, according to one embodiment.
Figure 5B:
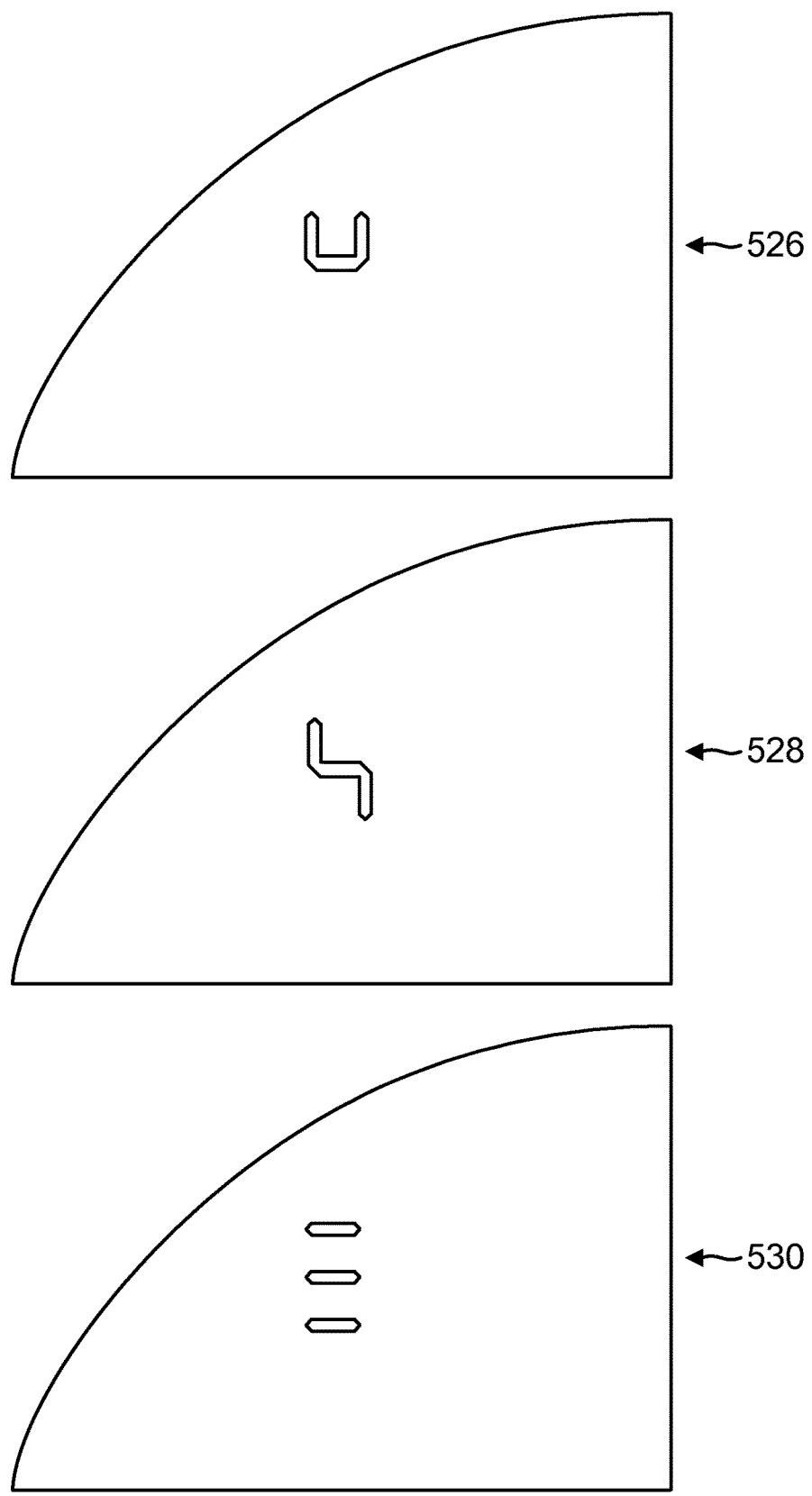
FIGS. 5B-5C show screen shots of a training game for a second working memory domain, according to one embodiment.

Training Game 206B:

FIG. 5A shows a process 500 for executing a second working memory domain game 206B. An example of one such game may be referred to as "Sci-Fi ID Numbers", shown in the screenshots of FIGS. 5B-5C, according to one embodiment. The objective of game 206B is to decrease the slot width assigned to each cognit by visually conditioning the user's numeric resolution. This is achieved by making a user accustomed to isolating essential cognit information and processing it as quickly as possible without error so that a next cognit may be received and processed.

Game 206B conducts exercises in a numeric domain where flashing numerals (see screen shots 526, 528, 530, 532, 534, 536 of FIG. 5B) are displayed at display device and a user has to accurately recognize a single digit from distracting characters that flank the single digit in rapid flashing frames. As the game level increases, the time that separates the flashing distracters from the flashed digit is reduced so that it becomes more difficult to separate the digit from the characters.

In one embodiment, game 206B uses animation to isolate a user's attention to the center of a display area. The variables associated with the challenge level include elapsed time between distracters and digits, the number of times the digit appears in a sequence before the game prompts the user for an answer, whether or not an audio signal is used to reinforce or distract from the displayed digit and the number of same distracters used in the sequence versus the number of different distracters used in the sequence. The game allows a user to improve the time course of the neural activity used to perceive numbers, improve differentiation and hence allows more cognits to fit in a single theta cycle.

Referring now to FIG. 5A, process 500 begins in block B502, when game 206B begins. The game is executed from a memory device by a processor.

In block B504, controller 214 for game 206B selects a key digit from 0 to 9 for each place value. The place value complexity depends on the challenge level for the game, for example, when a numeral is larger than 9, for example, "34".

In block B506, controller 214 identifies the total number of frames for a flashed sequence. This again depends on the challenge level. For example, in FIG. 5B, the sequence in screen shots 526, 528 and 530 show three flashing partial digits for a brief duration. The partial digits are selected for their visual similarity to a completely formed key digit. For example, the partial digit in screenshot 530 shows three segments and may be used to distinguish between numeral 2 (shown in screenshot 534, FIG. 5C) and the numeral "3".

In block B508, controller 214 identifies a number of times to display a completely formed key digit (CFKD), for example, 2, FIG. 2C. This information may also be stored at data structure 220.

In block B510, controller 214 retrieves partial digit display codes that are associated with the challenge level and the selected key digit. This information may also be a part of data structure 220.

In block B512, the CFKD and the partials digits are sequenced based on the challenge level for similarity of flanking partial digits to CFKD and the ratio of quantity of different PDs to recurring PDs.

In block B514, a timing sequence to display CFKD, partial digits and the time intervals between CFKD and partials digits as well as the time between the partial digits are retrieved from data structure 220 by controller 214.

Figure 5C:
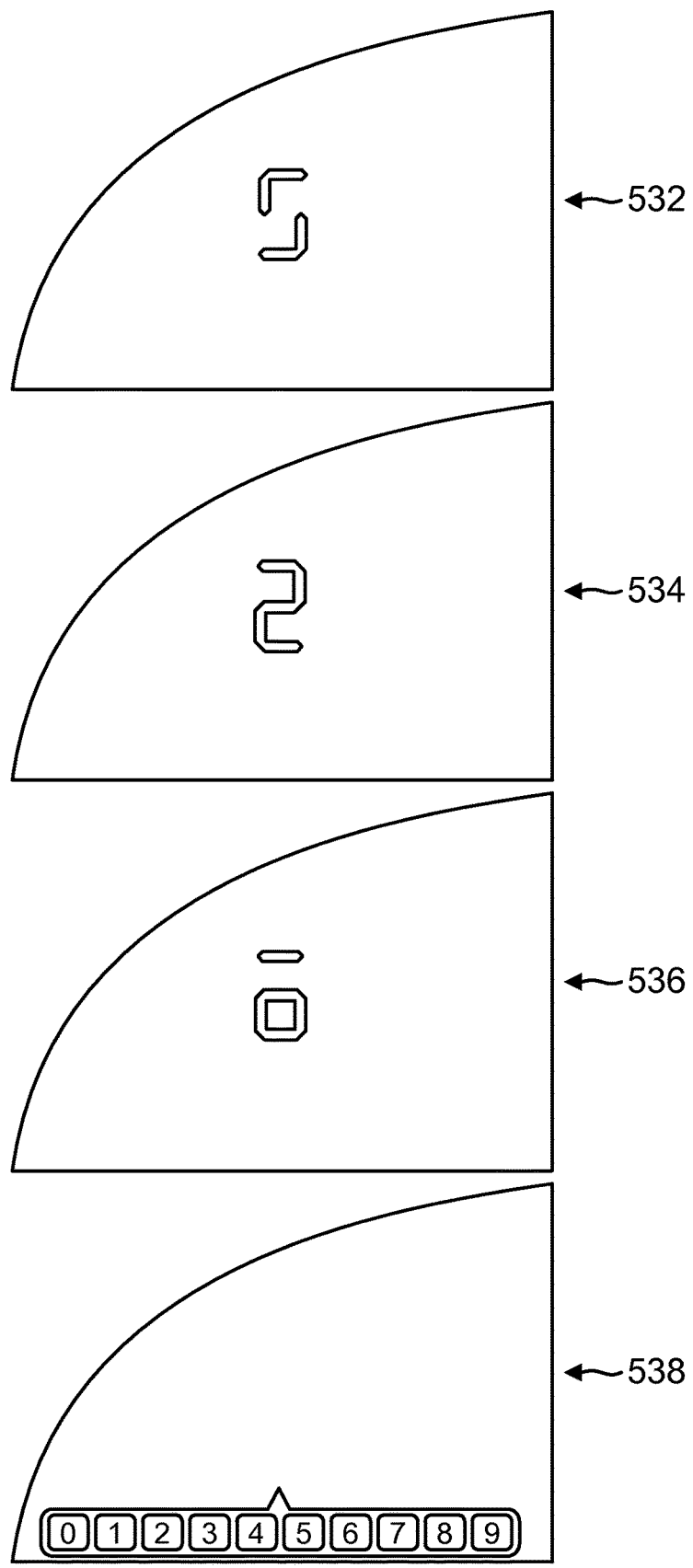

In block B516, animation engine 208 defines a visual contrast between digits and background and generates flashing series of partial digits and CFKDs. For example, the screenshots 532 and 536 of FIG. 5C show partial digits 5 and 6, while the complete digit is 2. In lower level games, the "2" may be displayed for slightly longer duration than the flanking partial digits to help a user recognize the digit and build the skills for game 206B.

In block B518, controller 214 determines if the user has provided an input for the correct numeral for the CFKD. If not, then in block B526, a feedback animation is executed and displayed illustrating the position and definition of the CFKd. Thereafter, in block B522, controller 214 determines if the user has erred on the same CFK at least for a threshold number of times, for example, 3. The threshold value may be stored at data structure 220. If yes, then in block B524, the challenge level for the user is reduced, the assessment module 210 is notified and the process moves back to block B504. The user may seek an answer for the key digit using screen shot 538. If the user did not err beyond the threshold value, then the process moves to block B516.

If the user did input the correct numeral in block B518, then in block B520, the challenge level for the user is increased and user data is updated by assessment module 210.

Figure 6A:
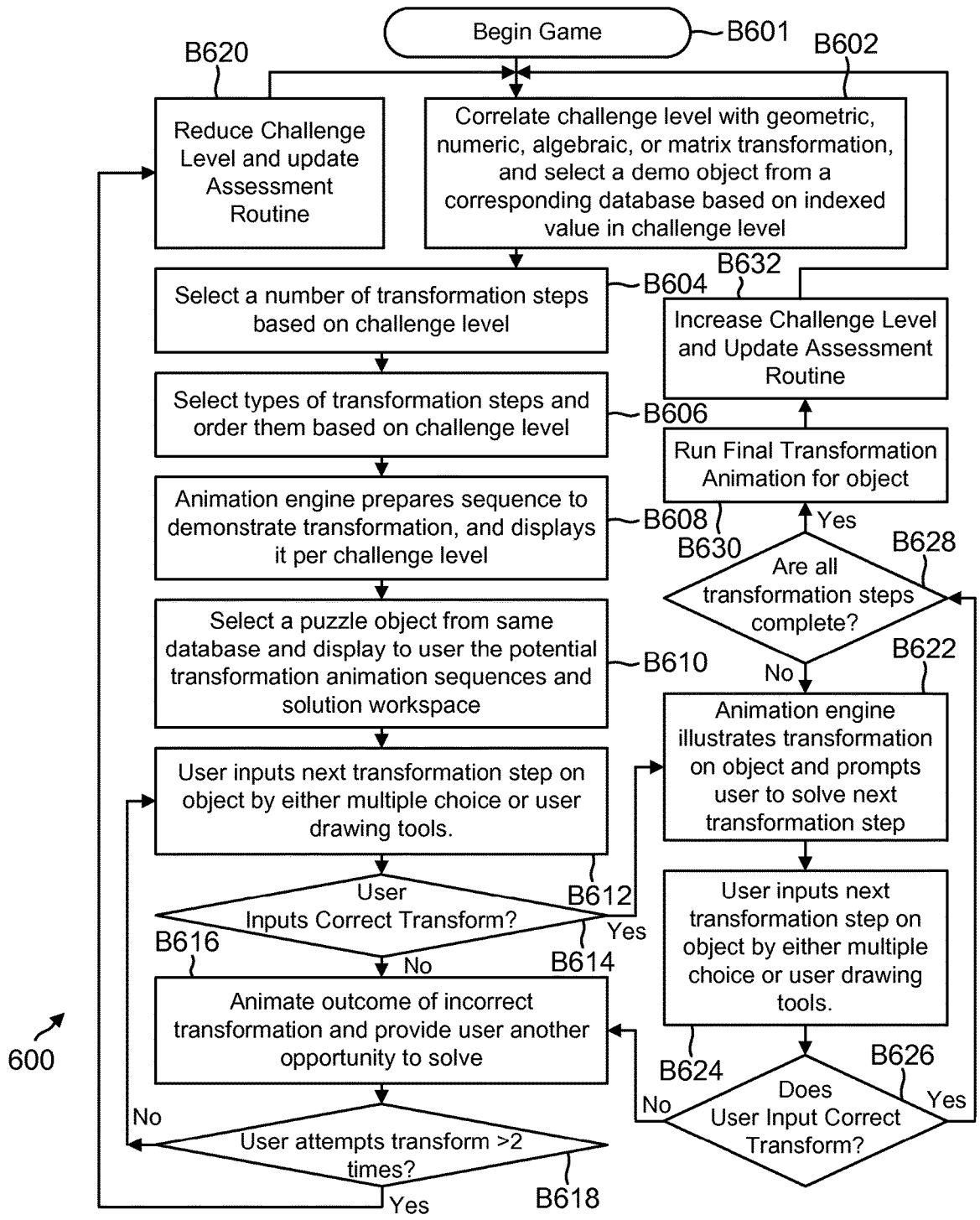
FIG. 6A shows a process flow of a training game for a third working memory domain, according to one embodiment.

Training Game 206C:

FIG. 6A shows a process 600 for executing game 206C, according to one embodiment. An example of game 206C may be "Match Transformation" that is shown in the screen shots of FIGS. 6B-6D that are described below in detail.

For retaining slots in a working memory from one cycle to the next cycle, it is desirable that the user maintain task persistence as an observed change is implemented. Game 206C implements several multi-steps, math transformation games to train this aspect of working memory. For example, in one embodiment, game 206C demonstrates a transformation of objects on a display device and then prompts the user to duplicate the transformation with a new object.

Figure 6B:
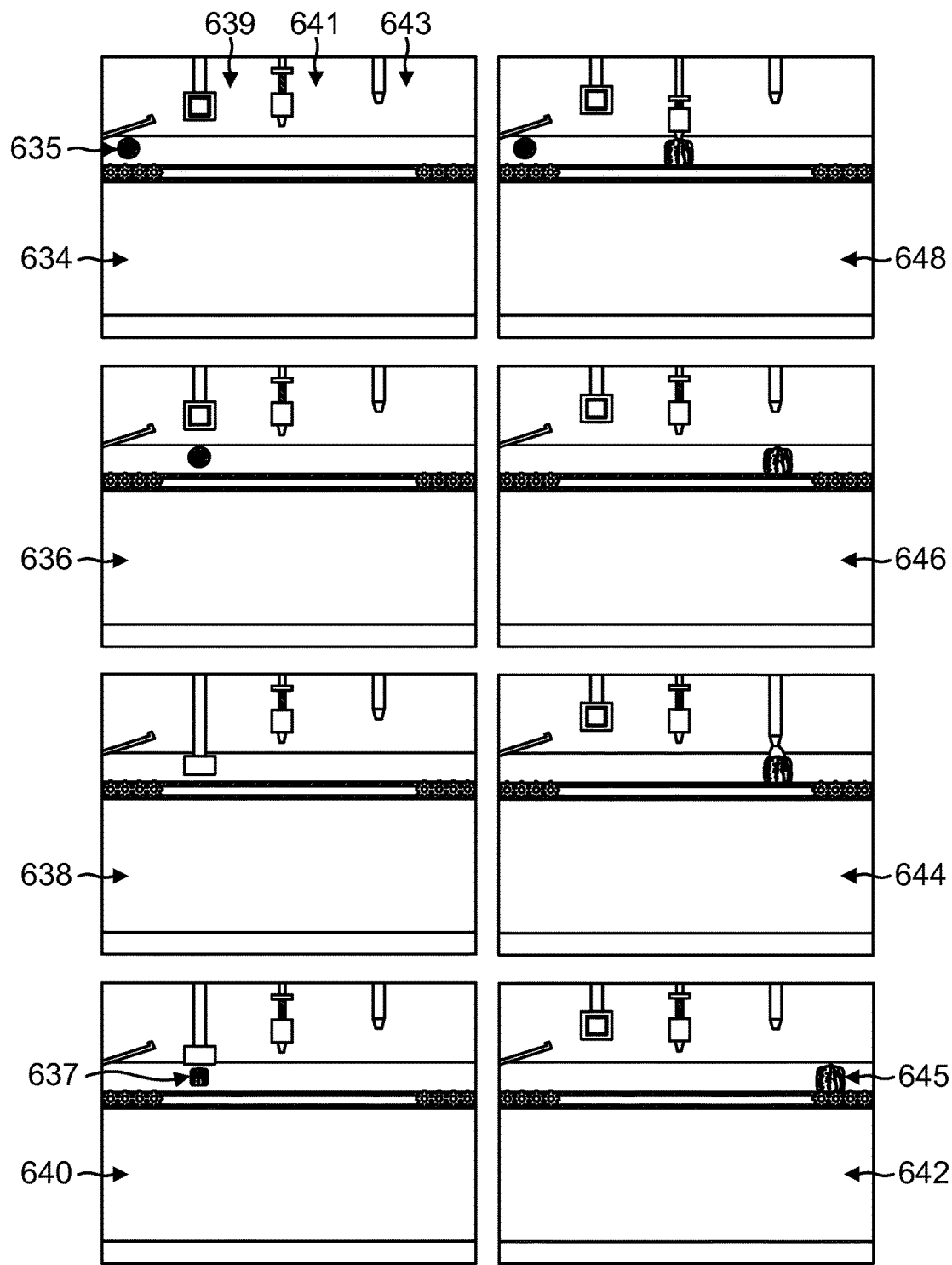
FIGS. 6B-6D show screen shots of a training game for a third working memory domain, according to one embodiment.

The user may be presented with an object 635 along a virtual conveyor belt and subjected to several machine stations (for example, 639, 641 and 643 of FIG. 6B). The machine stations operate on the object to alter the geometry and characteristics of the object. For example, the screenshots of FIG. 6B show a three step transformation process for transforming an object 635 into an object 637 (screen shots 634, 636, 638 and 640) and object 637 to object 645 (screen shots 648, 646, 644 and 642). The number of machine operations at various stations (639, 641 and 643, FIG. 6B)) is a variable that varies with s challenge level of the game 206C.

After each machine operation, the object's new feature is exhibited to the user before the conveyor belt advances the object to the next station. In one embodiment, the object transformation at each station is performed in a spatial-temporal manner without language or verbalization.

Once the series of machine operations are completed for a transformation sequence, the user is prompted with a new object (for example, 647, FIG. 6C) that is to be similarly transformed. This is shown in the screen shots of FIG. 6C, for example, 650, 652, 654 and 656. Based on the demonstrated transformation cycle, the user recalls what each station did and then duplicates that same transformation on the new object by choosing the transformation from a variety of options. For example, object 647 is transformed into object 649 (screenshot 652) by station 655. Object 649 is transformed into 653 by station 657 and 653 is transformed to 651 by station 659. Screenshots 664, 662, 660 and 658 show the animation for the correct answer corresponding to screen shots 650, 652, 654 and 656, respectively.

Figure 6C:
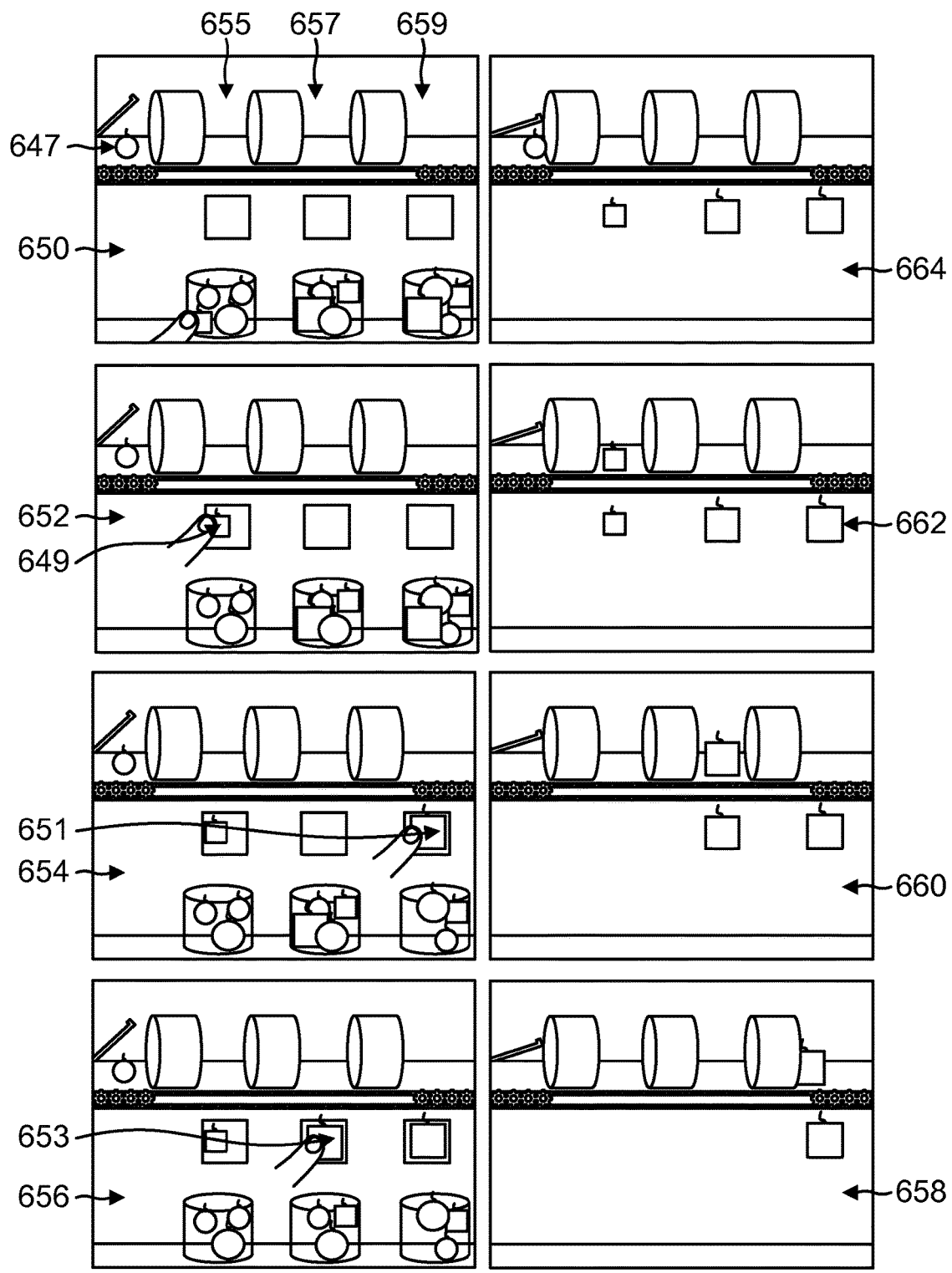

Once selections have been made, the conveyor belt restarts and checks the response provided at each step of FIG. 6C. Incorrect selections fall on the ground and block the animated signature character from getting across the screen.

Figure 6D:
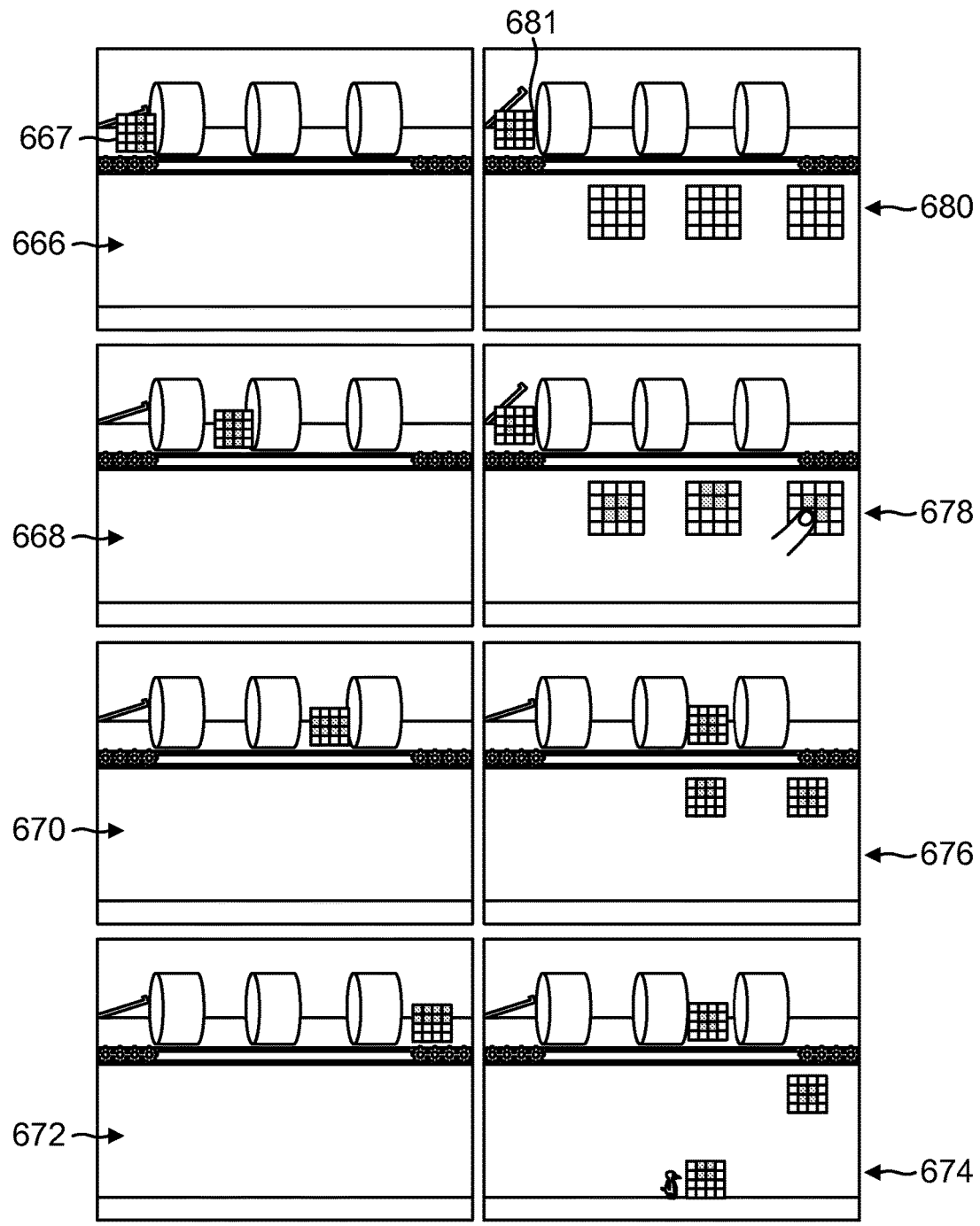

The screen shots of FIG. 6D show an alternate transformation technique with greater mathematic significance than FIGS. 6B-6C. In the screen shots 666, 668, 670 and 670, a transformation is demonstrated to the user. In the right hand column, i.e. screen shots 674, 676, 678 and 680, the user is prompted to duplicate the transformation.

For example, in screen shot 666, a 4×4 grid with four shaded blocks (667) in the third column is subjected to a transformation step. The rules of the transformation are displayed in screen shots 668, 670 and 672. In screen shot 680, the game offers an object with two shaded blocks (681) in the second column as well as three solution workspaces 683, for the user to draw the resulting transformed grids.

Screen shot 678 shows the user's answers and 676 shows a feedback animation for illustrating whether the user answered correctly. Screen shot 674, the game rejects the user's answer for the second transformation step.

Rather than transforming numerals, the machine operations in game 206C perform mathematic computations in a spatial-temporal manner. The machine operations consist of manipulating the object's color, size, shape, rotation, translation, symmetry, reflection, multiplication, division (fractional), dimensional (2-D to 3-D or vice versa), or matrix pattern.

The challenge levels for game 206C are controlled based on the user's prior performance in the game. Lower levels offer transformations in color, shape, and size with multiple choice selections on each transformation step. Transformations may be limited to two or three steps. Advanced levels of game challenge include transformations with mathematic operations, and more advanced spatial manipulation. Transformations may be increased to three to five steps and the machines may be hidden from view. The transformation step is no longer offered in a multiple choice format, but may be defined by the user by sketching on a grid.

Referring now to FIG. 6A, process 600 begins in block B601 when a computing system has initialized game 206C. In block B602, controller 214 for game 206C correlates a user challenge level with a geometric, numeric, algebraic or matrix transformation. Controller 214 also selects an object from database 220, based on an indexed value for the challenge level. The object is used for demonstration.

In block B604, the controller 214 of game 206C selects a number of transformation steps, based on the challenge level. This information may be obtained from data structure 220.

In block B606, based on the challenge level, the type of transformations that are performed by the machine operators are selected by controller 214.

In block B608, the animation engine 208 prepares a sequence to demonstrate the transformations on the selected object to user.

In block B610, controller 214 selects a puzzle object from the same database and displays potential transformations to the user.

In block B612, the user identifies a next transformation step on an object by either using a multiple choice option or user drawing tools.

In block B614, controller 214 determines if the user input corrects the transformation. If not, then in block B616, the incorrect outcome is animated and the user is provided additional opportunities to solve.

In block B618, the game determines if the user has attempted the same transformation a certain number of times, for example, twice. If not, the process moves to block B612. If yes, then in block B620, the challenge level for the game is reduced and the assessment module 210 updates user data.

Referring back to block B614, if user input was correct, then in block B622 animation engine 208 illustrates transformation of an object and prompts the user to solve a next transformation.

In block B624, the user identifies the next transformation, similar to block B612. Block B626 is similar to block B614 to determine if the user input corrects the transform. If not, then the process moves to block B616. If yes, then in block B628, controller 214 determines if all the transformations are complete. If not, the process moves back to block B622. If yes, then the final transformation is run in block B630. Thereafter, in block B632, the challenge level is increased and the assessment module 210 updates the user profile and data associated with game 206C.

Figure 7A:
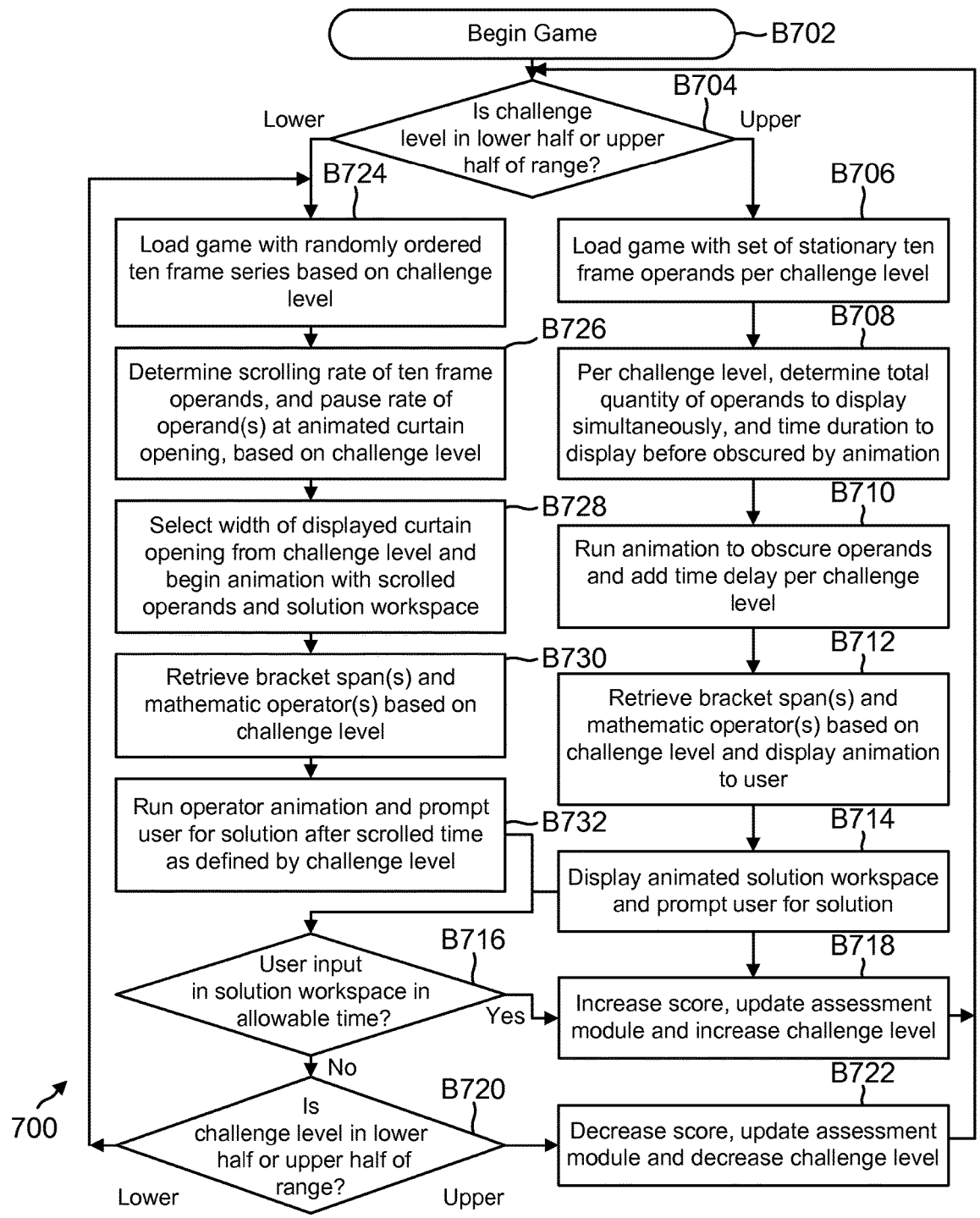
FIG. 7A shows a process flow of a training game for a fourth working memory domain, according to one embodiment.

Training Game 206D:

FIG. 7A and screen shots 7B-7C show an example of game 206D for the fourth working memory domain. The game may be referred to herein as "Ten Frame SERIAL OPERAND TEST".

The fourth working memory domain uses mathematical computation and swapping of mathematic operators or cognits as a series of slots are repeated along a theta waveform. Game 206D provides a display of a numerically significant arrangement of frame boxes, for example, a pair of 5 parallel frames boxes (see 744, 746, 748, 750 and 752 in screen shot 734 of FIG. 7B). Each box may either be empty or filled with an object, and the number of objects varies from one ten frame to the next. A user's working area is shown as a pair of empty frames boxes 754. The object of the game is for the user to mentally store the objects within the frame boxes 754.

Figure 7B:
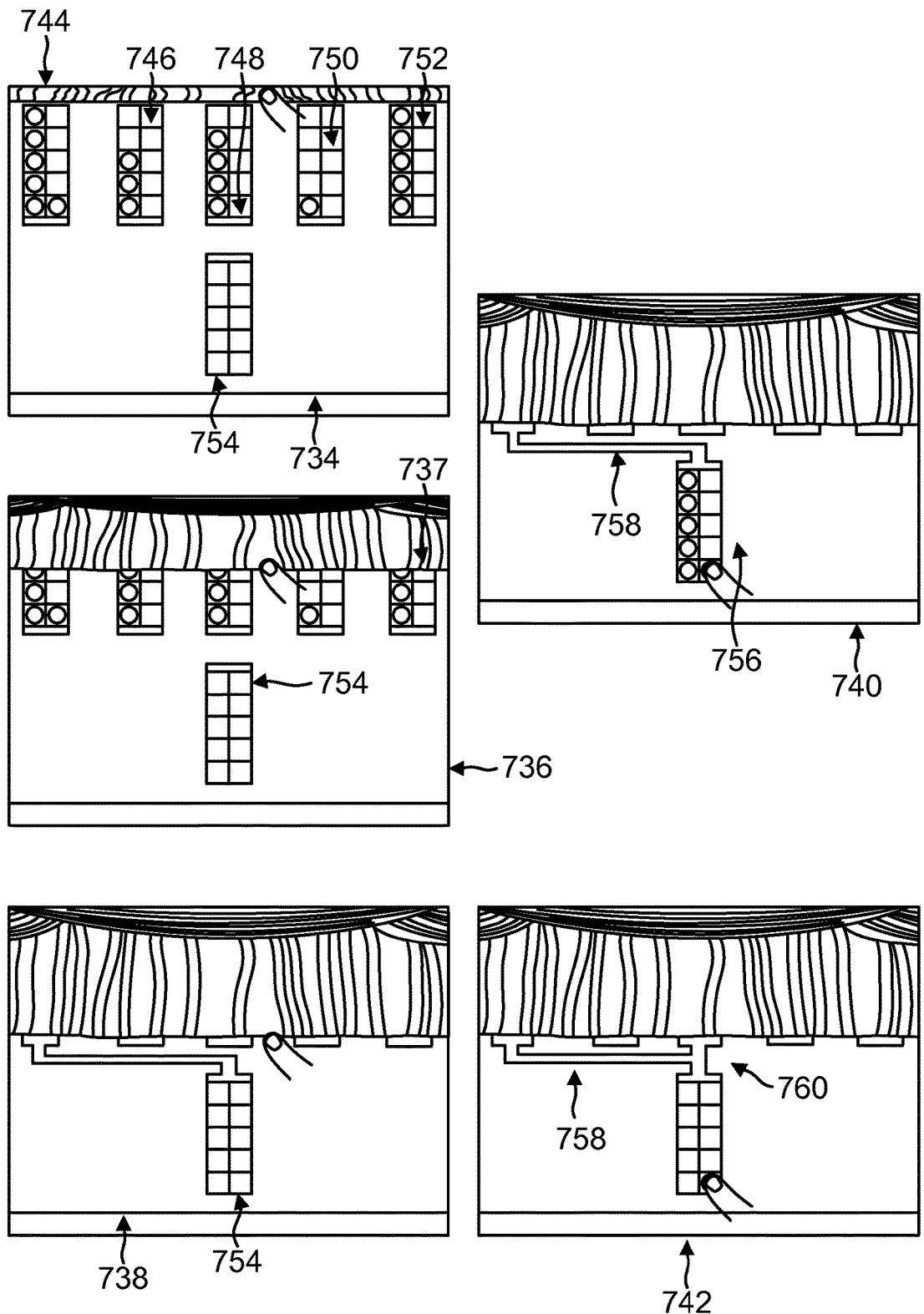
FIGS. 7B-7C show screen shots of a training game for a fourth working memory domain, according to one embodiment.
Figure 7C:
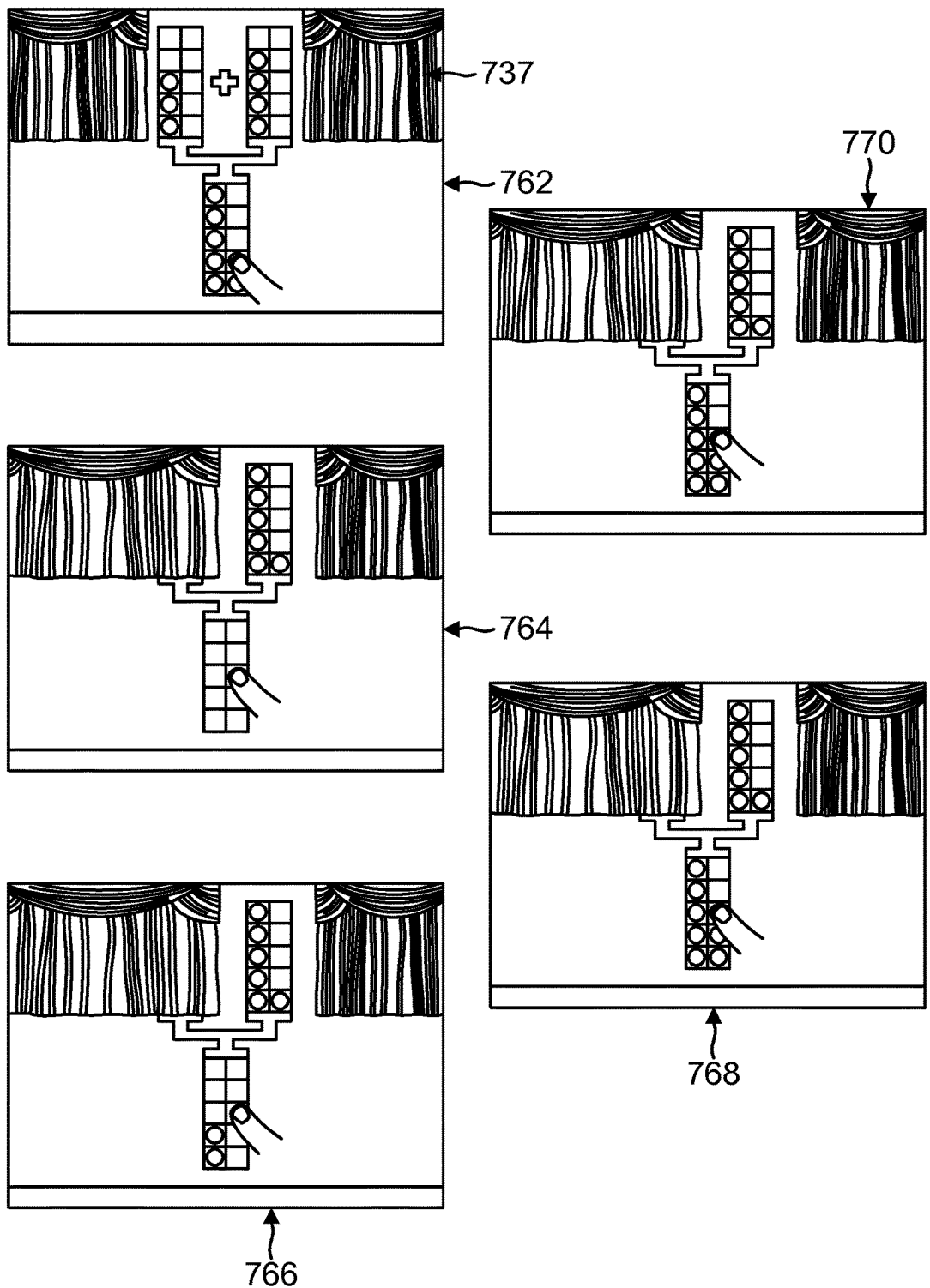

In one embodiment, the boxes may be stationery, as shown in the screen shots of FIG. 7B. In another embodiment, the frame boxes may be scrolled on the display screen, as shown in FIG. 7C. Depending upon the challenge level of the game, some or all of the previously viewed ten frames become gradually obscured once a new ten frame scrolls into view.

To maintain spatiality of this exercise, the box (or column) height in the 2-column ten frame may be limited so that the user relies on subitizing instead of assigning words to describe the number of objects in one ten frame.

Animation engine 208 may provide a non-distracting imagery including a simple fabric curtain 737 that may be used to cover the most of the ten frame boxes, revealing only one ten frame at a time.

The animation engine 208 also displays an operator bracket (758 and 760 in screen shot 742, FIG. 7B) that spans between two ten frames that need to be combined mathematically (for example, using addition or subtraction). The apparent spacing between the ten frames that are spanned by the bracket is a variable that is defined by the challenge level of the game.

The initial challenge level parameters are based on user selection or previous user performance. The integer value of the objects in the ten frames are randomized so that recurring integers within the scrolling ten frame sequence are not adjacent and occur at a level of frequency that is associated with the initial challenge conditions of the training level.

The game 206D creates a filter to scroll through the resulting data file of integers one at a time, and transmits the current and next value to the animation engine 208.

The animation engine 208 associates the integers with graphic files of objects in the ten frame boxes equal in number to the integers and displays a current ten frame for a predefined period of time on the screen. The animation engine 208 then gradually removes the objects from the user's view by displaying diminishing portions of the animation as the next ten frame is displayed as gradually appearing from behind the curtain.

The graphical user interface allows the user to select any number of boxes in the ten frames. As the boxes are selected, the animation engine fills them with the objects that appeared in the scrolling ten frames of the current game. Each cycle in the training is completed within a predefined interval that is also associated with challenge level and is factored into the performance assessment at the end of the training. If user input is a correct solution for the problem, the game increases a counter (e.g. 216) of correct answers for that user and that data is made available to the scoring and assessment module 210.

Referring back to FIG. 7B, in screen shot 740, the user fills in the objects for frame box 744 and the results are shown as 756.

In FIG. 7C, scrolling frame boxes are shown to the user. Screen shot 762 shows what the user needs to compute to solve the puzzle. Screen shot 764 shows another pair of ten frame boxes that need to be summed in a similar manner. Screen shot 766 shows the user beginning to solve the problem by recalling what objects were in the obscured ten frame and converting the blank squares of the ten frame solution workspace to squares with objects. Screen shot 768 shows the user dragging their finger across the ten frame solution workspace to complete the summation. Screen shot 770 shows the user confirming their answer and requesting the game to record the result.

Referring now to FIG. 7A, process 700 executes game 206D, according to one embodiment. The process begins in block B702, when the game 206D begins. The computing system executing the game is powered on and initialized.

In block B704, the controller 214 for game 206D determines if the challenge level for the game 206D is at a lower half or an upper half of a range. The controller 214 determines that by interfacing with the challenge level module 224 and using data structure 220.

When the challenge level is at the upper half (i.e. a lower challenge level), then in block B706, the game is loaded with a set of stationery ten frame operands, similar to the screenshots of FIG. 7B.

In block B708, controller 214 determines the number of operands that are to be displayed simultaneously and a duration to display the frame boxes, before the frame boxes are obscured by animation.

In block B710, animation engine 208 runs animation to obscure operands (738, FIG. 7B) and adds time delay per the challenge level.

In block B712, based on the challenge level, bracket spans and mathematic operators are retrieved and the animation is displayed to the user (742, FIG. 7B).

In block B714, the workspace 736 is displayed to the user and the user is prompted for a solution.

In block B716, controller 214 determines if the user input is provided within an allowable time. The allowable time is stored as a threshold value in data structure 220. If yes, then in block B718, the user score is increased and the assessment module 219 updates user profile and data. The user challenge level is then increased and the process moves back to block B704.

If the user input in block B716 is not received within the allowable time, then in block B720, controller 214 determines if the challenge level is in the lower or upper half of the range. If in the upper half, then in block B722, the score is decreased, the challenge level is decreased and the process moves back to block B704.

If the challenge level is in the lower half, then the process moves back to block B724 that is now described.

In block B724, the game is loaded with randomly ordered ten frame series, based on the challenge level. In block B726, controller 214 determines the scrolling rate at which the ten frame boxes is to be displayed and the rate of the operands is paused at the animated curtain opening.

In block B728, controller 214 selects the width of the curtain (766, 764 and 762 of FIG. 7C) to obscure frame boxes, and a pause rate of operands at the animated curtain, based on the challenge level. Thereafter, the animation with scrolled operands and solution workspace is started.

In block B730, the bracket spans and mathematic operators are retrieved by controller 214, based on the challenge level.

In block B732, operator animation is run and the user is prompted for a solution after a scrolled time, defined by the challenge level. The process then moves to block B716 that has been described above.

Training Game 206E:

To shield working memory from distracters, it is desirable that the user accurately fulfill the third and/or fourth goals of the working memory domain model while working in the presence of external distractions that are designed to confound an activity that is being processed at any given time. In one embodiment, this is achieved by training game 206E that offers various challenge levels and objectives. One example of game 206E is "Keep Count". Keep Count establishes a fixed, visual tempo or display rate at which identical objects are sequentially displayed and accumulated on a display screen. The visual tempo may be a variable that is increased with the overall challenge level for game 206E.

In one embodiment, no audio signal may be used in the game, but a variable is assigned the unit of measure beats per minute. The user has to quickly learn the visual tempo from visible objects and use that awareness to count a total number of objects presented in different scenes. The countable objects presented in each cycle of the game 206E may vary, for example, from three to 100. The total number of countable objects may be changed for each game cycle with the displayed size of each countable object. Both of these aspects are game variables that contribute to the challenge level. A higher number of objects, as well as smaller sized objects both increase the challenge level of the game.

The objects are not all visible to the user throughout the game. Some objects are partially or wholly visible, but many objects are obscured by a scene-appropriate animation throughout the game. The obscuring animation is a variable in the game. The percentage of countable objects that are obscured during each game may increase with the challenge level. The user continues to "count" the non-visible objects at the same visual tempo learned from the visible objects to arrive at a total number that equals or approximates within an acceptable range the number of objects presented by the invention.

Once the game reaches the total number of objects in the scene, it prompts the user for input. The user input may consist of a numeric entry from a keypad or virtual positioning of an adjustable slider that moves along a horizontal scale of numerals. The first user input is for an exact quantity and the second type of user input may be an estimation of a range of values, which is defined by the width of the slider. The slider width is a variable that also contributes to the challenge level of the game. A narrower slider has a smaller error tolerance for the user input, and is associated with higher challenge levels.

On introductory challenge levels, no additional distracters may be introduced. On intermediate challenge levels, animated, visible, flashing object(s) may be displayed at a visual tempo that is similar to the one used by the countable objects. These flashing objects may be geometrically and dimensionally similar to the countable objects. The characteristics of the flashing objects are variables that are altered based on the challenge level of the game. Flashing objects that are more similar to the countable objects are associated with higher challenge levels. Multiple flashing objects are more challenging than a single flashing object. The opposing tempo of the flashing objects is a variable associated with the challenge level of the game. Asynchronous opposing tempos that are more likely to displace the user's cognits are more challenging than opposing tempos that provide an overlapping synchronicity with the tempo of the countable objects.

Once the game 206E has presented all the countable objects, and the user has given an input to reflect the total number, controller 214 then provides an animated feedback to the user. The animated feedback reveals all the countable objects by removing the obscuring animation and retaining the placement and number of both the previously visible and hidden objects. The animated feedback then drags the countable objects into an organized and consolidated structure, which facilitates the user's quick visualization of the total number of objects. The total number of objects is indicated by a graphic symbol on the display and the user's input is compared with that value. If the user provided a value that matches the total number of countable objects and the error tolerance for that game cycle, the user's score is improved, and the assessment module may raise the challenge level of the next cycle of the game. If the user's input was incorrect, then the challenge level remains the same or is lowered if the user has already provided two other incorrect answers at the same challenge level.

Figure 8A:
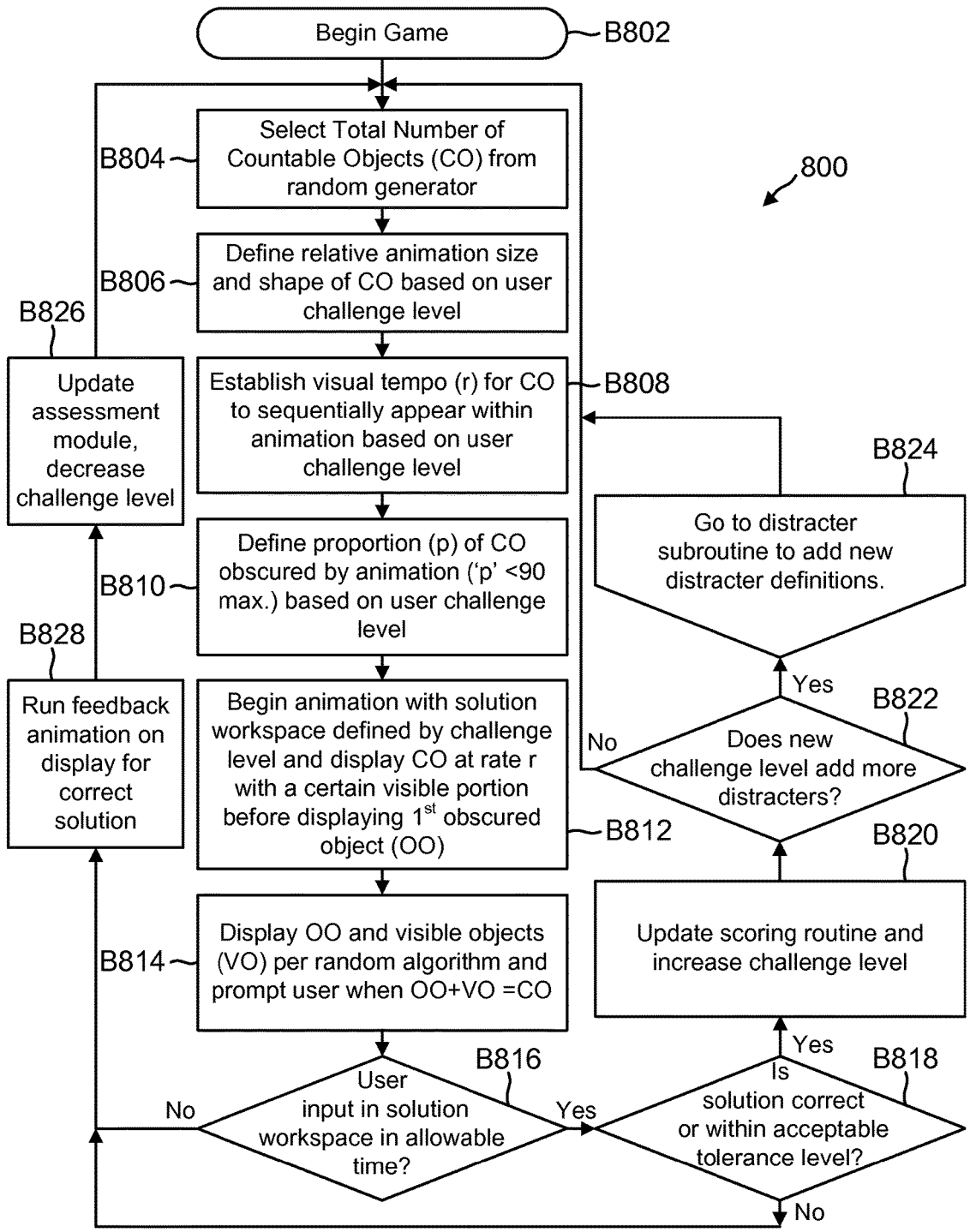
FIG. 8A shows a process flow of a training game for a fifth working memory domain, according to one embodiment.
Figure 8B:
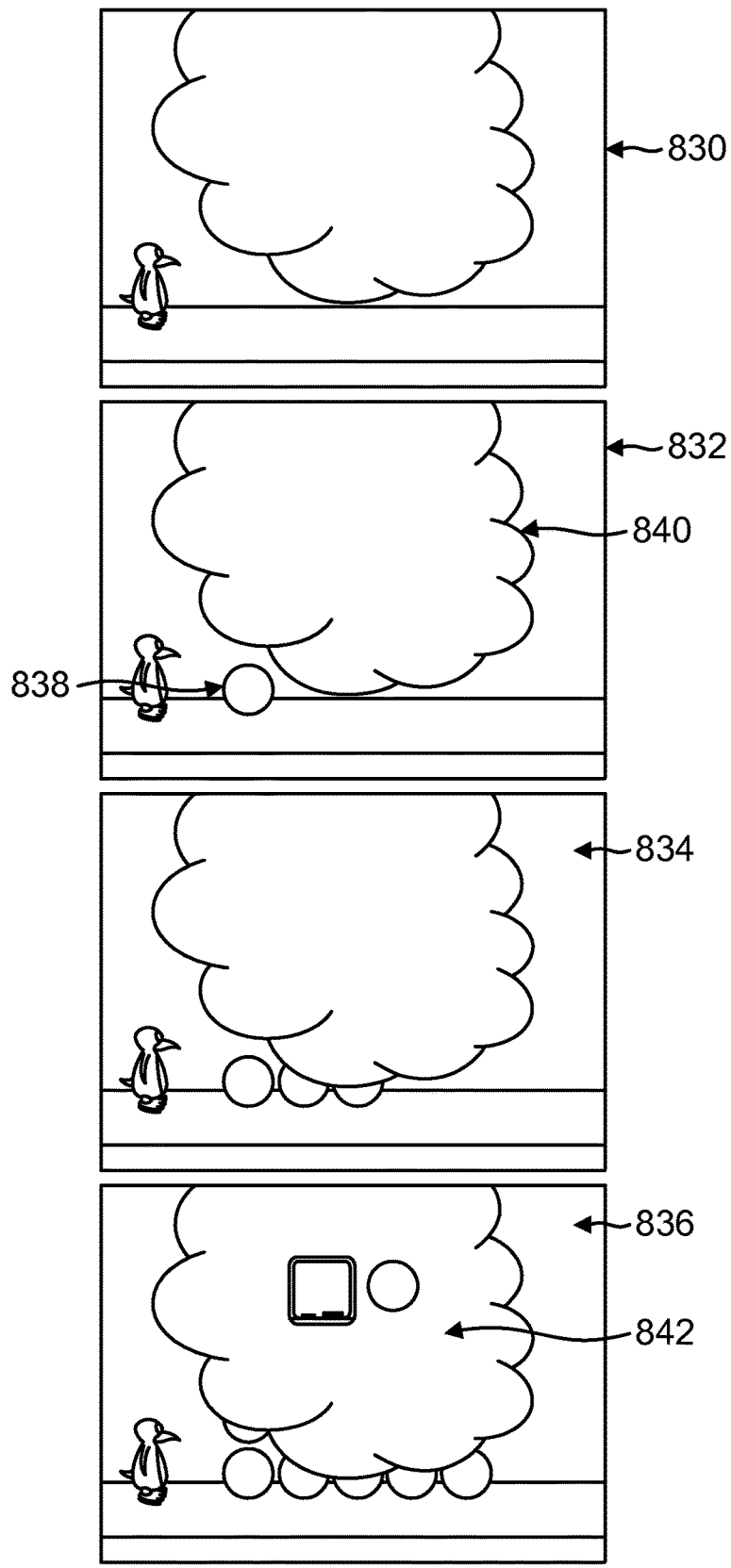
FIGS. 8B-8D show screen shots of a training game for a fifth working memory domain, according to one embodiment.
Figure 8C:
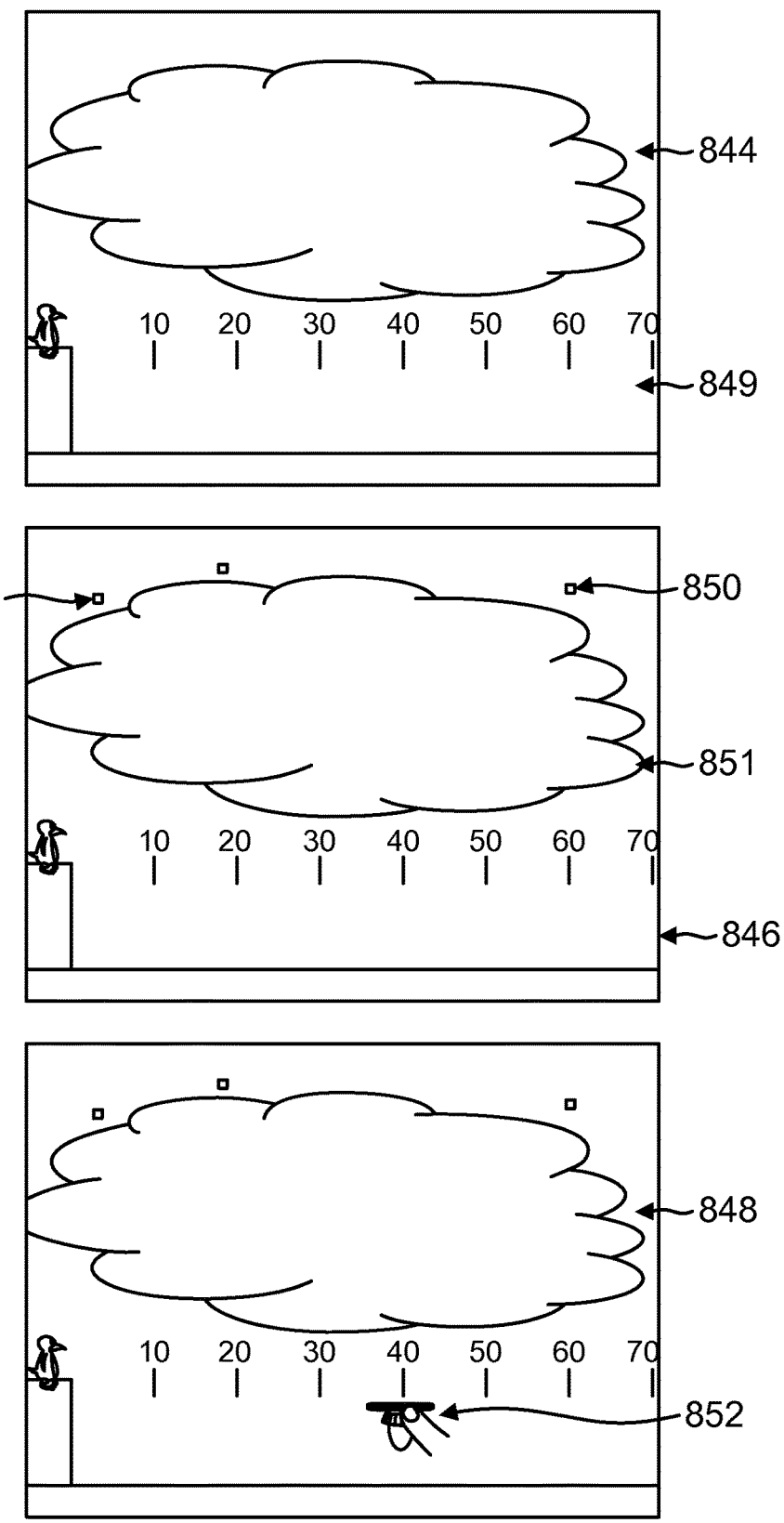
Figure 8D:
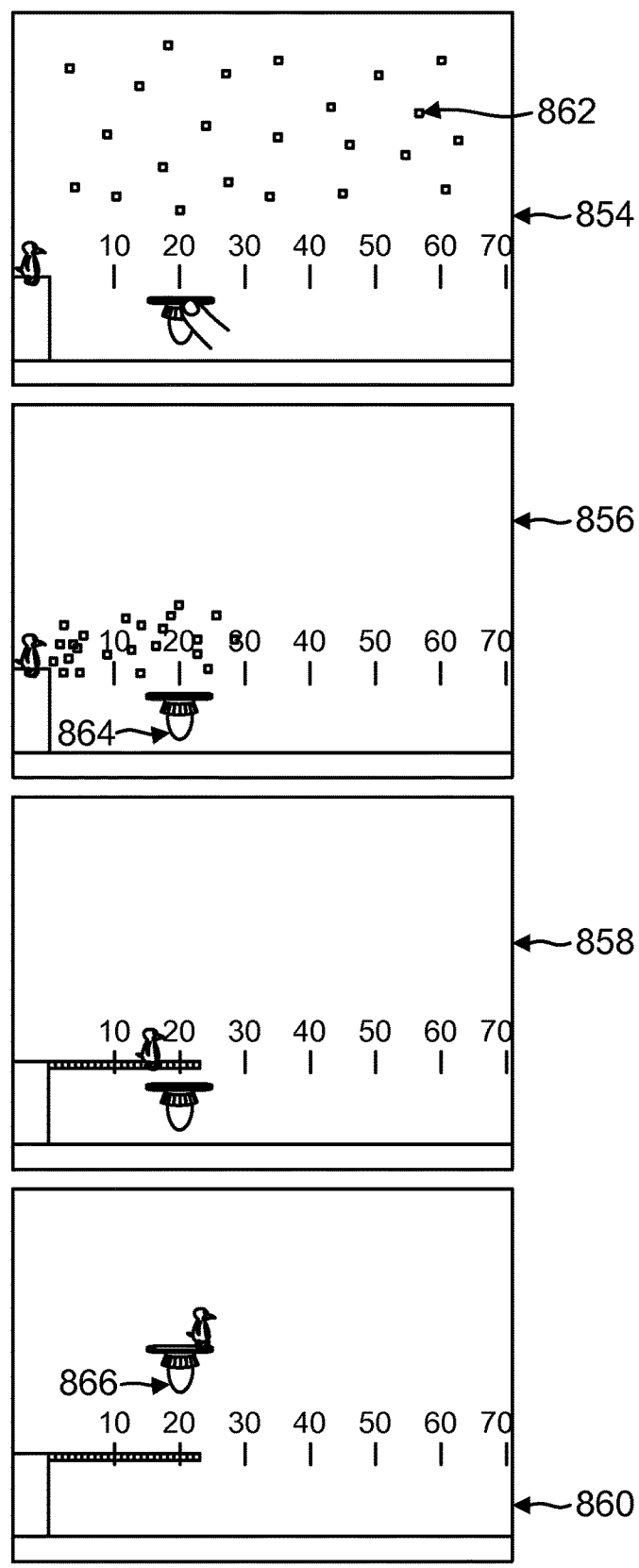

Screens shots of FIGS. 8B-8D show examples of game 206E. FIG. 8B screen shots 830, 832, 834 and 836 show a lower challenge level compared to FIG. 8C. The game begins with screen shot 830. Round objects 838 are displayed on the screen at a constant rate. The user is expected to count the objects even though cloud 840 obscures the objects. The game prompts the user to provide a total count, shown as 842 in screen shot 836.

FIG. 8C shows screens shots 844, 846 and 848 for an intermediate level of play for game 206E, according to one embodiment. Objects 850 are introduced at a constant rate and the user learns pacing and counting when cloud 851 obscures the objects. A slider control 849 is provided for the user to estimate (shown as 852) the number of objects. The user selects or positions the slider to solve the puzzle for a total number of objects.

FIG. 8D shows screen shots 854, 856, 858 and 860. The various objects 862 align based on user selection 864 of the slider control. If the user answer is correct, then an animated character crosses the bridge and flies off on a rocket blaster, shown as 860.

Referring now to FIG. 8A, process 800 for executing game 206E is shown, according to one embodiment. The process begins in block B802 when the computing system executing game 206E is powered on and operational.

In block B804, controller 214 for game 206E selects a total number of countable objects (CO) from a random generator (not shown). The random generator may be a part of controller 214 or operate as a separate module. The embodiments described herein are not limited to any location for the random generator. As an example, the range of CO may be 3 to 120.

In block B806, based on user challenge level, the relative animation size and shape of CO are defined by controller 214.

In block B808, a visual tempo for the CO to sequentially appear within an animation is established by controller 214. The tempo is again based on the user challenge level.

In block B810, the portion of the CO that is to be obscured by animation is determined by controller 214. The portion again depends on the user challenge level. In one embodiment, the portion is less than 90%.

In block B812, animation engine 208 begins animation within a solution workspace defined by the challenge level. The CO is displayed at a certain rate and a certain portion is made visible. For example, only $0.5[CO(100-p)/100]$ of a CO may be visible, where p is the proportion of CO that is obscured.

In block B814, an obscured object (OO) is displayed based on a random algorithm. The user is prompted when the countable object is equal to the obscured object and a visible object (VO).

In block B816, a user input is received. The game determines if the user input was received within an allowable time. The allowable time is a threshold value stored as part of data structure 220. If not, then in block B828, a feedback animation is executed to display the correct solution and thereafter, in block B826, the scoring routine is updated and the challenge level is decreased by challenge level module 224. The process then reverts back to block B804.

If the input was within an allowable time, then in block B818, the game determines if the solution was correct or within an acceptable tolerance level. If not, then the process moves to block B828. If yes, then in block B820, the scoring routine is updated and the challenge level is increased by challenge level module 224.

In block B822, controller 214 determines if the new challenge level adds more distracters, if yes, then in block B824, more distracter definitions are added. The process then moves back to block B804.

Cloud Computing:

The system and techniques described above are applicable and useful in the upcoming cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information to be available, on-demand, like a public utility.

Typical cloud computing providers deliver common business applications online which are accessed from another web service or software like a web browser, while the software and data are stored remotely on servers. For example, the various training games may be available in the cloud environment. The cloud computing architecture uses a layered approach for providing application services. A first layer is an application layer that is executed at client computers. In this example, the application allows a client to access storage via a cloud.

After the application layer, is a cloud platform and cloud infrastructure, followed by a "server" layer that includes hardware and computer software designed for cloud specific services. Details regarding these layers are not germane to the inventive embodiments.

Thus, a method and apparatus for enhancing working memory have been described. Note that references throughout this specification to "one embodiment" or "an embodiment" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the disclosure, as will be recognized by those of ordinary skill in the art.

While the present disclosure is described above with respect to what is currently considered its preferred embodiments, it is to be understood that the disclosure is not limited to that described above. To the contrary, the disclosure is intended to cover various modifications and equivalent arrangements within the spirit and scope of the appended claims.

What is claimed is:

1. A computing system, comprising:
 a user interface;
 a display device;
 a non-transitory storage device storing a plurality of processor executable training games, where each processor executable training game is associated with a domain defined by an objective for improving a specific aspect of a user's memory and each training game has a defined training goal to attain the objective of a user;
 a processor executing instructions out of the non-transitory storage device for presenting a plurality of selectable options within the user interface of the display device, for initializing one of the processor executable training games out of the non-transitory storage device of the computing system;
 an assessment module that assesses user performance for each processor executable training game by combining performance values for a same variable across the plurality of processor executable training games and provides a visual display at the display device as feedback for the plurality of processor executable training games played for each user selectable domain; and
 an assessment module interface for each processor executable training game that identifies a variable that is continuously assessed by the assessment module and an assessment outcome from the assessment module is provided to a challenge level module to correlate a challenge level for each processor executable training game and the domain, and the challenge level is adjusted based on assessment data from the assessment module;
 wherein a first selectable option from among the plurality of selectable options presents a first processor executable training game on the display device;
 wherein the first processor executable training game when executed, selects a master rune from a data structure maintained by the first processor executable training game and an animation engine animates and displays the master rune as a master tile on the display device embossed with an image having symbols, geometric designs or both, displays a plurality of geometric tiles on the display device where the animation engine scrolls the plurality of geometric tiles across the display device and the user attempts to mathematically combine and match the plurality of geometric tiles with the master tile within a certain duration; and
 wherein the first processor executable training game uses a counter to track a number of false negatives and a number of false positives based on user input, while the first processor executable training game is being played and when the number of false negatives has reached a first threshold value stored at the data structure, the challenge level for the first processor executable training game is increased by the challenge level module and when the number of false positives reaches a second threshold value stored at the data structure, the challenge level for the first processor executable training game is decreased by the challenge level module;
 wherein the plurality of geometric tiles are scrolled by the animation engine on the display device at a rate that depends on the challenge level for the first processor executable training game maintained by the challenge level module based on the assessment outcome by the assessment module;
 wherein a second selectable option when selected presents a second processor executable training game that displays a flashing frame within the display device and the user attempts using the computing system to identify a digit flanked by a flashing distracter displayed by the animation engine;
 wherein a time that separates a completely displayed digit and a partially displayed digit varies based on the challenge level for the second processor executable training game maintained by the challenge level module based on the assessment outcome by the assessment module; and
 wherein the second processor executable training game goal is different from the defined training goal of the first processor executable training game.

2. The computing system of claim 1, wherein the geometric tiles vary based on the challenge level.

3. The computing system of claim 1, wherein a third selectable option when selected presents a third processor executable training game that displays, using the animation engine, a first moving object that is transformed by a plurality of operations at a plurality of stations and when a second moving object moves through the plurality of stations at the display device, the user is prompted to perform a plurality of transformations for the second moving object based on transformations of the first moving object in a particular sequence.

4. The computing system of claim 3, wherein a fourth selectable option when selected presents a fourth processor executable training game for that displays, using the animation engine, an arrangement for a plurality of frame boxes where some of the frame boxes have objects and the some of the frame boxes are displayed for a certain duration with mathematical operands before they are covered at the display device such that content of the some of the frame boxes are not visible.

5. The computing system of claim 4, wherein the fourth processor executable training game displays a working region for the user at the display device to recall objects from the plurality of frame boxes to perform a mathematic operation, and place the recalled objects into a corresponding location of the working region at the display device.

6. The computing system of claim 5, wherein a number of mathematic operands and types of operands vary based on the challenge level for the fourth processor executable training game.

7. The computing system of claim 5, wherein a fifth processor executable training game displays a plurality of identical objects at the display device at a certain display rate and the user is prompted to provide a number of objects that are displayed.

8. The computing system of claim 7, wherein the certain display rate varies based on the challenge level for the fifth processor executable training game.

9. The computing system of claim 8, wherein, based on the challenge level of the fifth processor executable training game, distracters are displayed at a rate similar to, or different from, the certain display rate of the plurality of identical objects.

10. A machine implemented method, comprising:
presenting a plurality of selectable options within a user interface of a display device by a processor of a computing device, where each of the plurality of selectable options is associated with a domain, and when selected by a user, initializes one of a plurality of processor executable training games stored at a non-transitory storage device, where each processor executable training game is associated with the domain further defined by an objective for improving a specific aspect of a user's memory and each processor executable training game has a defined training goal to attain the objective;
wherein a user performance for each processor executable training game is assessed by an assessment module by combining performance values for a same variable across the plurality of processor executable training games and an assessment module interface for each processor executable training game identifies a variable that is assessed by the assessment module while the processor executable training game is being played; and wherein an assessment outcome from the assessment module is provided to a challenge level module to correlate a challenge level for each processor executable training game and the domain, and then adjust the challenge level based on the assessment outcome by the assessment module that also provides visual feedback for the processor executable training games played for each domain;
selecting a first selectable option from among the plurality of selectable options via the user interface, wherein the first selectable option from among the plurality of selectable options presents a first processor executable training game at the display device;
executing the first processor executable training game by the processor, selecting a master rune by the processor from a data structure maintained by the first processor executable training game and animating and displaying by the processor the master rune as a master tile on the display device embossed with an image having symbols, geometric designs or both;
displaying a plurality of geometric tiles scrolled within the display device by the processor that the user attempts to mathematically combine and match with the master tile within a certain duration;
wherein the plurality of geometric tiles are scrolled within the display device by the processor at a rate that depends on the challenge level for the first processor executable training game and the plurality of geometric tiles vary based on the challenge level that is maintained by the challenge level module based on the assessment outcome by the assessment module; and
using a counter for tracking by the processor a number of false negatives and a number of false positives based on user input, while the first processor executable training game is being executed and when the number of false negatives has reached a first threshold value stored at the non-transitory storage device, the challenge level for the first processor executable training game is increased by the challenge level module executed by the processor and when the number of false positives reaches a second threshold value stored at the non-transitory storage device, the challenge level for the first processor executable training game is decreased by the challenge level module executed by the processor;
wherein a second selectable option when selected presents a second processor executable training game that displays a flashing frame within the display device and the user attempts to identify a displayed digit flanked by a flashing distracter; and wherein a time that separates a completely displayed digit and a partially displayed digit varies based on the challenge level for the second processor executable training game that is maintained by the challenge level module based on the assessment outcome by the assessment module; and wherein the second processor executable training game goal is different from the defined training goal of the first processor executable training game.

11. The machine implemented method of claim 10, wherein the user selects the challenge level for either the first or second processor executable training game associated with one of the plurality of selectable options.

12. The machine implemented method of claim 10, wherein if the user has played the first processor executable training game before, then user data is used to set the challenge level for the first processor executable training game.

13. The machine implemented method of claim 10, wherein a third processor executable training game, when executed by the processor, displays at the display device a first moving object that is transformed by a plurality of operations at a plurality of stations and when a second moving object moves through the plurality of stations, the user is prompted to perform a plurality of transformations for the second moving object similar to the transformations of the first moving object.

14. The machine implemented method of claim 13, wherein a fourth processor executable training game when executed by the processor, displays at the display device a plurality of frame boxes with some of the plurality of frame boxes having objects and a working region for the user to recall objects, perform a mathematic operation, and place the objects into a corresponding location of the working region and wherein some of the plurality of frame boxes are displayed at the display device for a certain duration with the mathematical operation before the objects are covered such that some of the of the plurality of frame boxes are not visible to the user when the user has to recall the objects and the mathematical operation.

15. The machine implemented method of claim 14, wherein a fifth processor executable displays a plurality of identical objects at a certain display rate and the user is prompted to provide a number of objects that are displayed.

16. A non-transitory, machine readable storage medium having stored thereon instructions for performing a method, comprising machine executable code which when executed by at least one machine, causes the machine to:
present a plurality of selectable options within a user interface of a display device by a processor of a computing device, where each of the plurality of selectable options is associated with a domain, and when selected by a user, initializes one of a plurality of processor executable training games, where each processor executable training game is associated with the domain further defined by an objective for improving a specific aspect of a user's memory and each processor executable training game has a defined training goal to attain the objective;
wherein a user performance for each processor executable training game is assessed by an assessment module by combining performance values for a same variable across the plurality of processor executable training games and an assessment module interface for each processor executable training game identifies a variable that is assessed by the assessment module while the processor executable training game is being played; and wherein an assessment outcome from the assessment module is provided to a challenge level module to correlate a challenge level for each processor executable training game and the domain, and then adjust the challenge level based on the assessment outcome by the assessment module that also provides visual feedback for the processor executable training games played for each domain;
select a first selectable option from among the plurality of selectable options via the user interface, wherein the first selectable option from among the plurality of selectable options presents a first processor executable training game at the display device;
to execute the first processor executable training game, select a master rune by the processor from a data structure maintained by the first processor executable training game, and animate and display by the processor the master rune as a master tile on the display device embossed with an image having symbols, geometric designs or both;
display a plurality of geometric tiles scrolled within the display device by the processor that the user attempts to mathematically combine and match with the master tile within a certain duration;
wherein the plurality of geometric tiles are scrolled within the display device by the processor at a rate that depends on the challenge level for the first processor executable training game and the plurality of geometric tiles vary based on the challenge level that is maintained by the challenge level module based on the assessment outcome by the assessment module; and
use a counter to track by the processor a number of false negatives and a number of false positives based on user input, while the first processor executable training game is being executed and when the number of false negatives has reached a first threshold value stored at the non-transitory storage device, the challenge level for the first processor executable training game is increased by the challenge level module executed by the processor and when the number of false positives reaches a second threshold value stored at the non-transitory storage device, the challenge level for the first processor executable training game is decreased by the challenge level module executed by the processor;
wherein a second selectable option when selected presents a second processor executable training game that displays a flashing frame within the display device and the user attempts to identify a displayed digit flanked by a flashing distracter; and wherein a time that separates a completely displayed digit and a partially displayed digit varies based on challenge level for the second processor executable training game that is maintained by the challenge level module based on the assessment outcome by the assessment module; and wherein the second processor executable training game goal is different from the defined training goal of the first processor executable training game.

17. The non-transitory, machine readable storage medium of claim 16, wherein a third selectable option when selected presents a third processor executable training game that displays a first moving object at the display device that is transformed by a plurality of operations at a plurality of stations and when a second moving object moves at the display device through the plurality of stations, the user is prompted to perform a plurality of transformations for the second moving object based on transformations of the first moving object in a particular sequence.

18. The non-transitory, machine readable storage medium of claim 17, wherein a fourth selectable option when selected presents a fourth processor executable training game that displays on the display device an arrangement for a plurality of frame boxes where some of the plurality of frame boxes have objects with a working region for the user to recall objects from the plurality of frame boxes to perform a mathematic operation, and place the recalled objects into a corresponding location of the working region; and wherein a number of mathematic operands and types of operands vary based on the challenge level for the fourth processor executable training game.

19. The non-transitory, machine readable storage medium of claim 18, wherein a fifth processor executable training game displays a plurality of identical objects at the display device at a certain display rate and the user is prompted to provide a number of objects that are displayed; and wherein the certain display rate varies based on the challenge level for the fifth processor executable training game and distracters are displayed at a rate similar to, or different from, the certain display rate of the plurality of identical objects.

\* \* \* \* \*